US009089982B2

(12) United States Patent
Tokura et al.

(10) Patent No.: US 9,089,982 B2
(45) Date of Patent: Jul. 28, 2015

(54) APPARATUS PROVIDED WITH CARTRIDGE HOLDER RECEIVING PEN OR CUTTER

(71) Applicants: Masashi Tokura, Konan (JP); Noriharu Tashiro, Nagoya (JP)

(72) Inventors: Masashi Tokura, Konan (JP); Noriharu Tashiro, Nagoya (JP)

(73) Assignee: BROTHER KOGYO KABUSHIKI KAISHA, Nagoya-shi (JP)

( * ) Notice: Subject to any disclaimer, the term of this patent is extended or adjusted under 35 U.S.C. 154(b) by 0 days.

(21) Appl. No.: 14/212,187

(22) Filed: Mar. 14, 2014

(65) Prior Publication Data

US 2014/0260855 A1 Sep. 18, 2014

(30) Foreign Application Priority Data

Mar. 15, 2013 (JP) ................................ 2013-053189

(51) Int. Cl.
*G06F 15/00* (2006.01)
*B26D 5/00* (2006.01)
*B26F 1/38* (2006.01)
*B26D 5/02* (2006.01)

(52) U.S. Cl.
CPC ................ *B26D 5/005* (2013.01); *B26D 5/007* (2013.01); *B26F 1/3813* (2013.01); *B26D 5/02* (2013.01); *B26D 2005/002* (2013.01); *Y10T 83/162* (2015.04); *Y10T 83/173* (2015.04)

(58) Field of Classification Search
CPC ..... H04N 7/173; H04N 21/8456; H04N 5/76; H04N 7/17318; H04N 21/23418; H04N 21/26603; H04N 21/4312; H04N 21/4314; H04N 21/4334; H04N 21/440281; H04N 21/4622; H04N 21/4782; H04N 21/6125; H04N 21/84; G06F 17/241
USPC ........................................................ 358/1.18
See application file for complete search history.

(56) References Cited

U.S. PATENT DOCUMENTS

2005/0186010 A1* 8/2005 Shibata et al. ................ 400/621
2012/0253504 A1 10/2012 Kawaguchi et al.

FOREIGN PATENT DOCUMENTS

JP 2013-13977 A 1/2013

* cited by examiner

*Primary Examiner* — Martin Mushambo
(74) *Attorney, Agent, or Firm* — Fox Rothschild LLP

(57) ABSTRACT

An apparatus includes a cartridge configured to receive a pen or a cutter, a receiving mechanism configured to receive an object, a first moving mechanism configured to move the cartridge in a first movement direction, a second moving mechanism configured to move the object in a second direction perpendicular to the first movement direction, a third moving mechanism configured to move the cartridge in a direction such that the cartridge comes close to the receiving mechanism, and a processor configured to instruct the apparatus to set an orientation of a pattern to be formed on the object, to arrange the pattern while conforming the pattern orientation to an object orientation, to drive the first and second moving mechanisms according to the pattern orientation, and to drive the third moving mechanism to cause the cartridge to move in a direction such that the cartridge comes close to the receiving mechanism.

20 Claims, 18 Drawing Sheets

| PATTERN DATA:Dat | |
|---|---|
| TYPE NUMBER DATA:Da | 5 |
| TOTAL NUMBER DATA:Db | 8 |
| FIRST PATTERN PART | |
| COLOR DATA:Dc1 | WHITE |
| PROCESSING DATA:Dd1 | cut |
| NUMBER DATA:De1 | 4 |
| DISPLAY POSITION DATA:Df1 | Df1 |
| SECOND PATTERN PART | |
| COLOR DATA:Dc2 | RED |
| PROCESSING DATA:Dd2 | cut |
| NUMBER DATA:De2 | 1 |
| DISPLAY POSITION DATA:Df2 | Df2 |
| THIRD PATTERN PART | |
| COLOR DATA:Dc3 | YELLOW |
| PROCESSING DATA:Dd3 | cut |
| NUMBER DATA:De3 | 1 |
| DISPLAY POSITION DATA:Df3 | Df3 |
| FOURTH PATTERN PART | |
| COLOR DATA:Dc4 | BLUE |
| PROCESSING DATA:Dd4 | cut |
| NUMBER DATA:De4 | 1 |
| DISPLAY POSITION DATA:Df4 | Df4 |
| FIFTH PATTERN PART | |
| COLOR DATA:Dc5 | GREEN |
| PROCESSING DATA:Dd5 | cut |
| NUMBER DATA:De5 | 1 |
| DISPLAY POSITION DATA:Df5 | Df5 |

| Cut | |
|---|---|
| LINE TYPE INFORMATION | STRAIGHT |
| START POINT | P1(x,y) |
| LINE NUMBER INFORMATION | 4 |
| NEXT POINT | P2(x,y) |
| NEXT POINT | P3(x,y) |
| NEXT POINT | P4(x,y) |

| Df1 | |
|---|---|
| MATRIX ELEMENT | a11 |
| MATRIX ELEMENT | a21 |
| MATRIX ELEMENT | a12 |
| MATRIX ELEMENT | a22 |
| MATRIX ELEMENT | a13 |
| MATRIX ELEMENT | a23 |

FIG. 27

APPARATUS PROVIDED WITH CARTRIDGE HOLDER RECEIVING PEN OR CUTTER

CROSS-REFERENCE TO RELATED APPLICATIONS

This application is based upon and claims the benefit of priority from the prior Japanese Patent Application No. 2013-053189 filed on Mar. 15, 2013, the entire contents of which are incorporated herein by reference.

BACKGROUND

1. Technical Field

The present disclosure relates to an apparatus provided with a cartridge holder receiving a pen or a cutter and a non-transitory computer-readable medium storing data of instructions for the apparatus.

2. Related Art

There has been conventionally provided processing apparatuses which process a sheet-shaped object to obtain a desired pattern. For example, a cutting plotter has been conventionally known as an apparatus cutting an object to be cut, such as paper or cloth. The cutting apparatus includes a storage device storing data of a plurality of patterns. A user selects a desired pattern while viewing patterns displayed on a display of the cutting apparatus. The cutting apparatus cuts the object to obtain the selected pattern, based on selected pattern data.

SUMMARY

When the object is a piece of cloth made up of warp and woof, it is desirable that arrangement of the pattern should be determined in consideration of directions in which the warp and woof extend, namely, a direction of grain of cloth. Furthermore, when cloth or paper as the object to be cut has a design such as vertically striped pattern, it is desirable that arrangement of the pattern should be determined according to the design. However, the conventional cutting apparatus cannot meet with the above-mentioned demands. The user needs to consider the relationship between arrangement of a pattern and a direction of grain of cloth or a design when the object is set on the cutting apparatus. The setting is troublesome.

Therefore, an object of the disclosure is to provide an apparatus and a non-transitory computer-readable medium, both of which can easily conform the direction of the pattern arranged on the object to a direction specified from the object and can accordingly improve the usability.

The present disclosure provides an apparatus including a cartridge configured to receive a pen or a cutter, a receiving mechanism configured to receive an object, a first moving mechanism configured to move the cartridge in a predetermined first movement direction, a second moving mechanism configured to move the object in a second direction perpendicular to the predetermined first movement direction, a third moving mechanism configured to move the cartridge in a direction such that the cartridge comes close to the receiving mechanism, and a processor configured to instruct the apparatus to set an orientation of a pattern to be formed on the object, based on pattern data, arrange the pattern while conforming the orientation of the pattern to an orientation of the object, drive the first and second moving mechanisms according to the orientation of the pattern and the pattern data, and drive the third moving mechanism to cause the cartridge to move in a direction such that the cartridge comes close to the receiving mechanism.

The disclosure also provides a non-transitive computer-readable medium for an apparatus including a cartridge configured to receive a pen or a cutter, a receiving mechanism configured to receive an object, a first moving mechanism configured to move the cartridge in a predetermined first movement direction, a second moving mechanism configured to move the object in a second direction perpendicular to the predetermined first movement direction, and a third moving mechanism configured to move the cartridge in a direction such that the cartridge comes close to the receiving mechanism, wherein the computer-readable medium storing computer-readable instructions, when executed by a processor of the apparatus, cause the apparatus to set an orientation of the pattern to be formed on the object based on pattern data, arrange the pattern conforming the orientation of the pattern to an orientation of the object, and drive the first and second moving mechanisms according to the orientation of the pattern and the pattern data, and drive the third moving mechanism to cause the cartridge to move in a direction such that the cartridge comes close to the receiving mechanism.

The disclosure further provides an apparatus including a pen or a cutter, a receiving mechanism configured to receive an object, a first moving mechanism configured to move the pen or the cutter in a predetermined first movement direction, a second moving mechanism configured to move the object in a second direction perpendicular to the predetermined first movement direction, a third moving mechanism configured to move the pen or the cutter in a direction such that the pen or the cutter comes close to the receiving mechanism, a processor configured to instruct the apparatus to set an orientation of a pattern to be formed on the object, based on pattern data, arrange the pattern conforming the orientation of the pattern to an orientation of the object, drive the first and second moving mechanisms according to the orientation of the pattern and the pattern data, and drive the third moving mechanism to cause the pen or the cutter to move in a direction such that the pen or the cutter comes close to the receiving mechanism.

BRIEF DESCRIPTION OF THE DRAWINGS

In the accompanying drawings:

FIG. 27 is an example of a conceptual diagram of configuration of pattern data.

DETAILED DESCRIPTION

Figure 1:
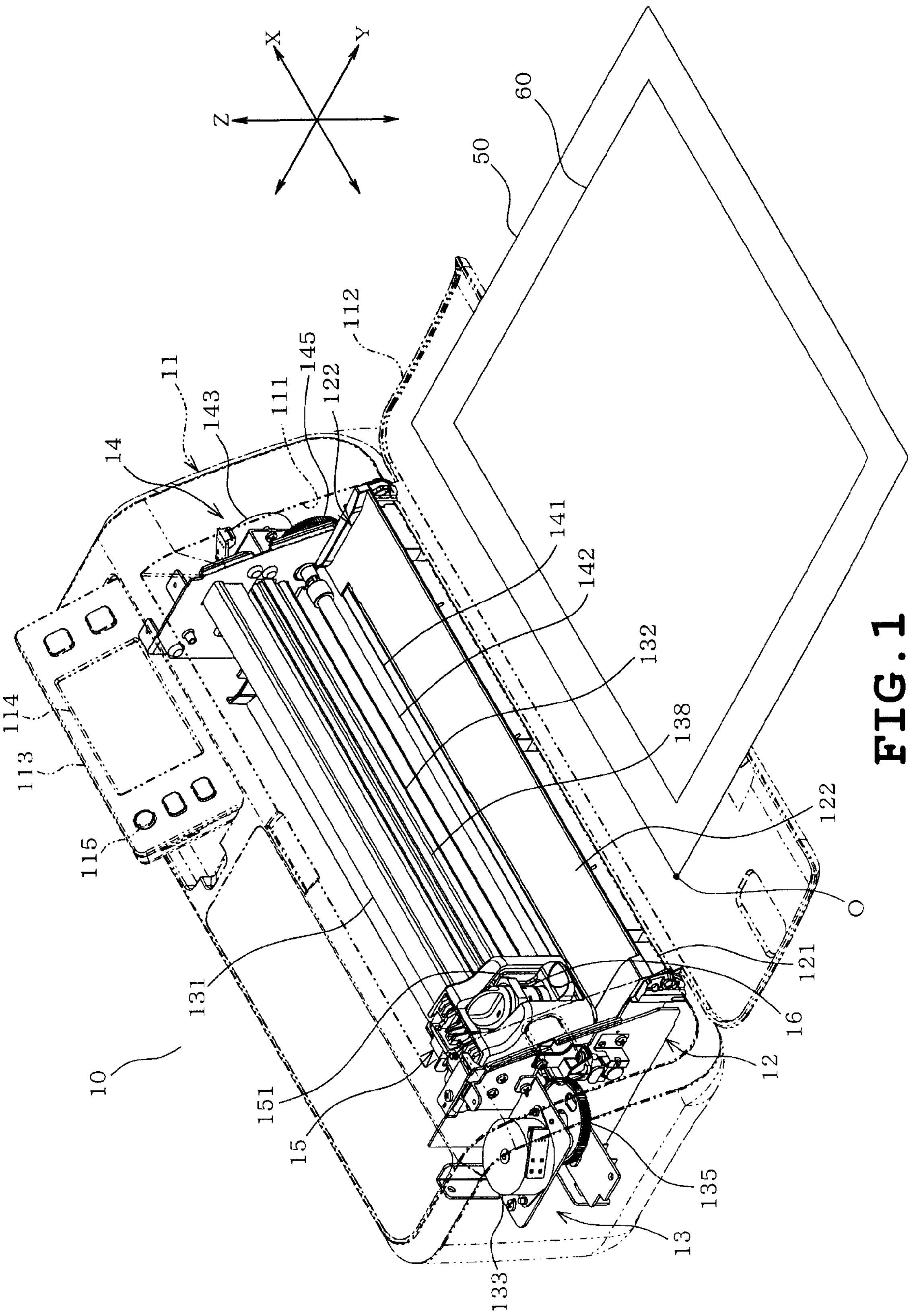
FIG. 1 is an example of a perspective view of a cutting apparatus as the processing apparatus.
Figure 2:
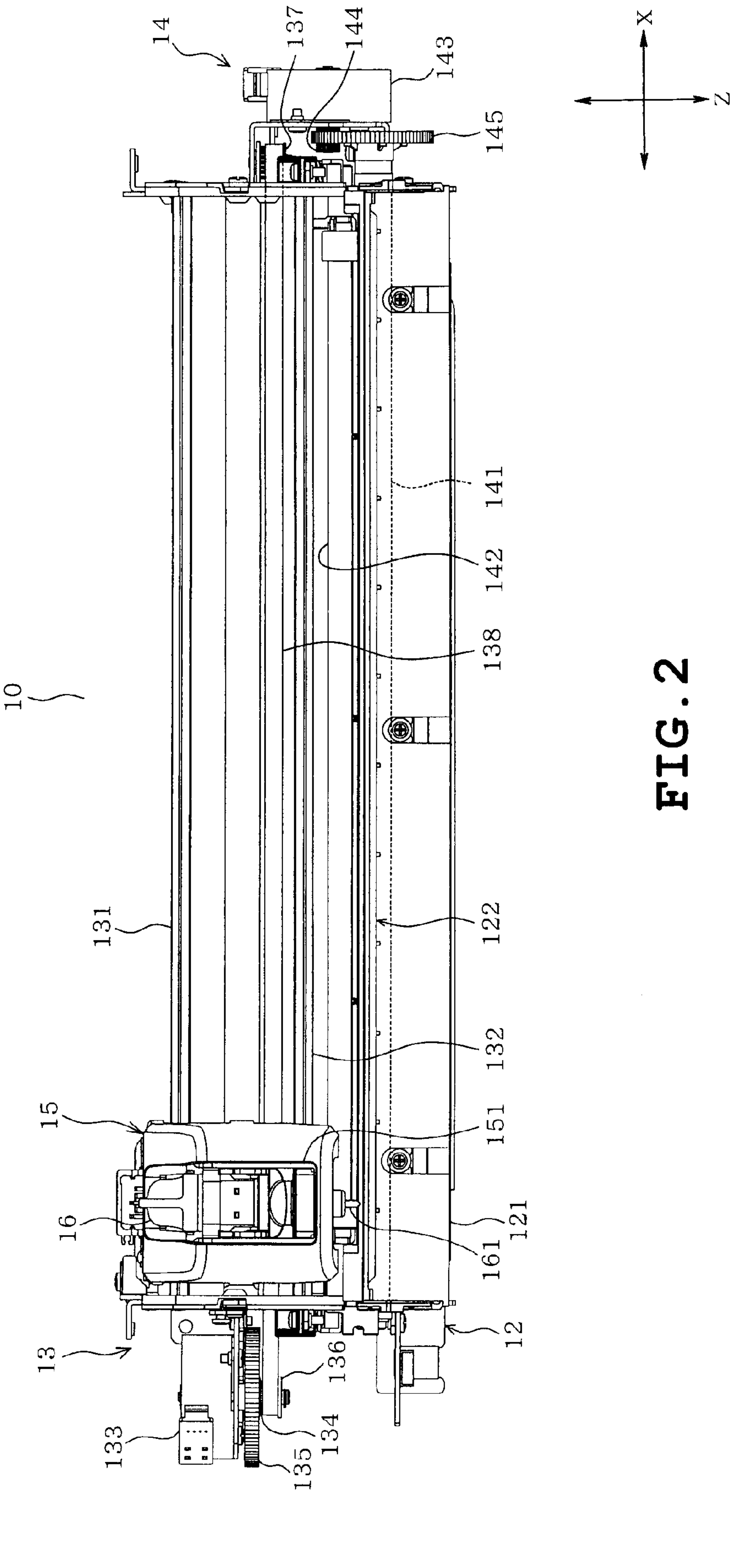
FIG. 2 is an example of a front view of the cutting apparatus with a body cover being removed.

One example of a processing apparatus and one example of a program for processing apparatus will be described with reference to the accompanying drawings. Referring to FIGS. 1 and 2, a cutting apparatus 10 serving as a processing apparatus is shown. The cutting apparatus 10 cuts a workpiece 21 held on a holding member 20 shown in FIG. 1 into a desired configuration. The cut workpiece serves as a cut object. The holding member 20 is a flat plate made of resin and has an adhesive layer (not shown) on a surface thereof. The workpiece 21 such as cloth or paper is affixed to the adhesive layer thereby to be held.

The cutting apparatus 10 includes a body cover 11, a body 12, an X-axis moving mechanism 13, a Y-axis moving mechanism 14, a carriage 15 and a cutter cartridge 16. The cutter cartridge 16 is detachably attached to the carriage 15. The cutter cartridge 16 has a distal end to which a cutter 161 is replaceably mounted. In this case, the cutter cartridge 16 provided with the cutter 161 functions as a processing part which processes the workpiece 21.

The body cover 11 is formed into the shape of a rectangular box as a whole and covers the body 12, the X-axis moving mechanism 13, the Y-axis moving mechanism 14, the carriage 15 and the cutter cartridge 16. In the following description, a lengthwise direction of the body cover 11 will be referred to as "right-left direction." The side where an opening 111 is located will be referred to as "front" of the cutting apparatus 10. A right-left direction relative to the cutting apparatus 10 will be referred to as "X direction." A front-rear direction relative to the cutting apparatus 1 will be referred to as "Y direction." An up-down direction relative to the cutting apparatus 1 will be referred to as "Z direction."

The opening 111 is formed in a front of the body cover 11. The body cover 11 also has another opening (not shown) which is formed in a rear surface so as to be opposed to the opening 111 and through which the holding member 20 is passable. The body cover 11 includes a front cover 112 and an operation panel 113. The front cover 112 has a lower end pivotally mounted on the body cover 11, so that the front cover 112 is rotated between a first position where the opening 111 is opened and a second position where the opening 111 is closed. The operation panel 113 is mounted on a top of the body cover 11 and includes an input display portion 114 configured of a touch liquid crystal display and a plurality 8 of switches 115, for example. The user operates the touch liquid crystal display 114 and the operation panel 113 to make various settings and to confirm operating conditions. In this case, the input display 114 functions as an input receiving input from the user and a display which displays information to the user.

The body 12 includes a base 121 and a receiving mechanism 122. The base 121 is provided on a bottom of the body cover 11 and formed into the shape of a rectangular frame. The receiving mechanism 122 is formed into the shape of a substantially horizontal flat plate. The workpiece 21 is placed on the receiving mechanism 122. The receiving mechanism 122 is subjected to pressure a lower end of the cutter cartridge 16 applies to the workpiece 21 and the holding member 20.

The X-axis moving mechanism 13 moves the carriage 15 in the X direction, that is, in the right-left direction. The X-axis moving mechanism 13 includes a pair of upper and lower X-axis guide rails 131 and 132, an X-axis motor 133, an X-axis driving gear 134, an X-axis driven gear 135, a pair of timing pulleys 136 and 137 and a timing belt 138. The X-axis guide rails 131 and 132 extend horizontally one above the other. The X-axis motor 133 is comprised of a stepping motor, for example. Rotation of the X-axis motor 133 is transmitted to the X-axis driving gear 134, which is rotated with a rotational shaft of the X-axis motor 133. The X-axis driven gear 135 is in mesh engagement with the X-axis driving gear 134.

The left timing pulley 136 is provided below the X-axis driven gear 135. The X-axis timing pulley 136 is rotated together with the X-axis driven gear 135 with rotation of the X-axis driven gear 135. The timing belt 138 extends between the left and right timing pulleys 136 and 137. The timing belt 138 includes a part connected to the carriage 15 although the connection is not shown in detail.

In the above-described construction, when the X-axis motor 133 is rotated, rotation thereof is transmitted to the timing belt 138 via the X-axis driving gear 134, the X-axis driven gear 135 and the left timing pulley 136. As a result, the carriage 15 is moved in the X direction, that is, in the right-left direction with the movement of the timing belt 138.

The Y-axis moving mechanism 14 moves the workpiece 21 held by the holding member 90 in the Y direction, that is, in the front-rear direction. The Y-axis moving mechanism 14 includes a driving roller 141, a pinch roller 142, a Y-axis motor 143, a Y-axis driving gear 144 and a Y-axis driven gear 145. The driving roller 141 and the pinch roller 142 extend in parallel to the X-axis guide rails 131 and 132 so that central axes of the rollers 141 and 142 are directed in the right-left direction, that is, in the X direction. The holding member 20 disposed between the driving roller 141 and the pinch roller 142 is pressed against the driving roller 141 by the pinch roller 142.

The Y-axis motor 143 is comprised of a stepping motor, for example. Rotation of the Y-axis motor 143 is transmitted to the Y-axis driving gear 144, which is rotated together with a rotational shaft of the Y-axis motor 143. The Y-axis driven gear 145 is provided on a right end of the driving roller 141. The Y-axis driven gear 145 is in mesh engagement with the Y-axis driving gear 144.

In the above-described construction, when the Y-axis motor 143 is rotated, rotation thereof is transmitted to the driving roller 141 via the Y-axis driving and driven gears 144 and 145. Rotation of the driving roller 141 is transmitted to the holding member 20 held between the driving roller 141 and the pinch roller 142. As a result, the holding member 20 is moved in the Y direction perpendicular to an axial direction of the driving roller 141.

The carriage 15 includes a cartridge holder 151 and a Z-axis moving mechanism (not shown). The cartridge holder 151 is provided in front of the carriage 15 and holds the cartridge 16 so that the cartridge 16 is detachably attachable. The cartridge 16 is fixed to the cartridge holder 151 while the blade of the cutter 30 is exposed as shown in FIG. 2. The Z-axis moving mechanism (not shown) is provided inside the carriage 15 to move the cartridge holder 151 in the up-down direction, that is, in the Z direction together with the cutter cartridge 16.

In the above-described construction, when the cartridge holder 151 is moved downward by the Z-axis moving mechanism, a distal end of the cutter 161 mounted to the cutter cartridge 161 bites into the workpiece 21 held on the sheet-shaped holding member 20. In the state where the distal end of the cutter 161 bites into the workpiece 21, the carriage 15 is moved in the X direction by the X-axis moving mechanism 13 and the workpiece 21 is moved in the Y direction by the Y-axis moving mechanism 14, whereby a desired shape is cut out of the workpiece 21. In this case, the X-axis moving mechanism 13, the Y-axis moving mechanism 14 and the Z-axis moving mechanism provided on the carriage 15 function as a relative moving unit which relatively move the workpiece 21 and the cutter 161 mounted on the cutter cartridge 16.

Figure 3:
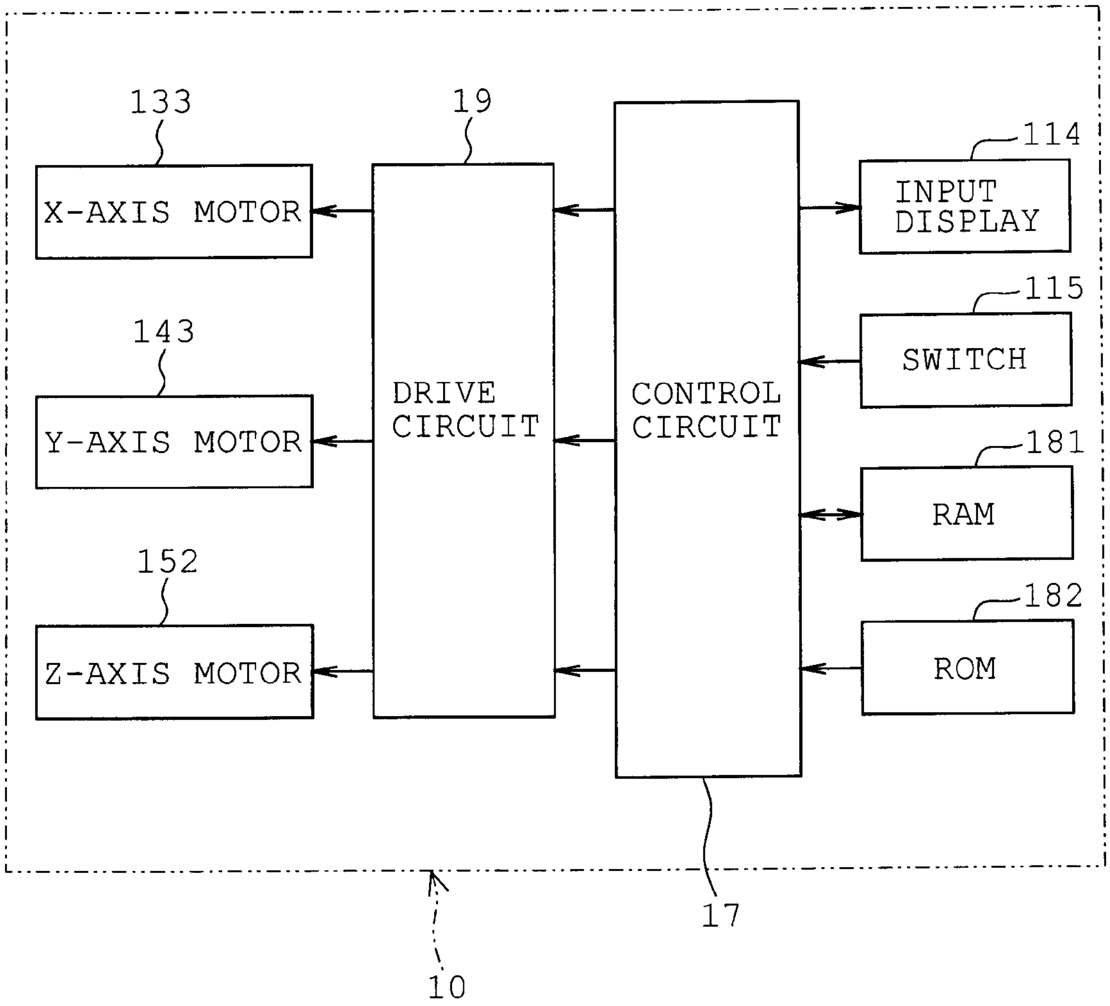
FIG. 3 is an example of a block diagram showing an electrical arrangement of the cutting apparatus.

The cutting apparatus 10 includes a control circuit 17 serving as a control unit, as shown in FIG. 3. The control circuit 17 is comprised of a central processing unit (CPU) and controls the entire cutting apparatus 10. To the control circuit 17 are connected the input display 114 and the switch 115 of the operation panel 113, a RAM 181, a ROM 182 and a drive circuit 19. The RAM 181 stores cutting data to drive the motors 133, 143 and 152 in order that a desired shape may be cut out of the object 91, and the like. The ROM 182 stores a drive control program to control the motors 133, 143 and 152 on the basis of the cutting data stored in the RAM 161. The drive circuit 19 drives the motors 133, 143 and 152 based on instructions from the control circuit 17. The processing data will be described in detail later.

Figure 5:
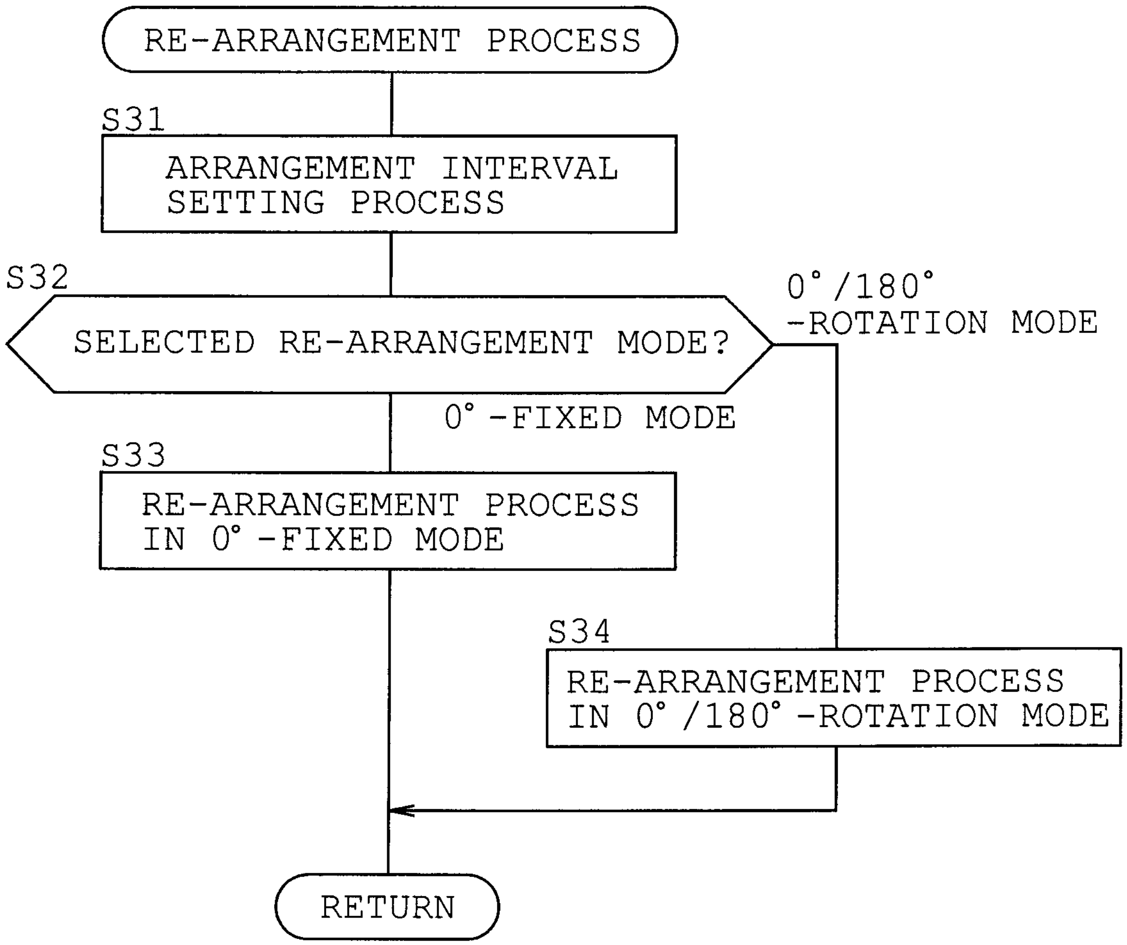
FIG. 5 is an example of a second flowchart showing control contents of the control circuit.
Figure 6:
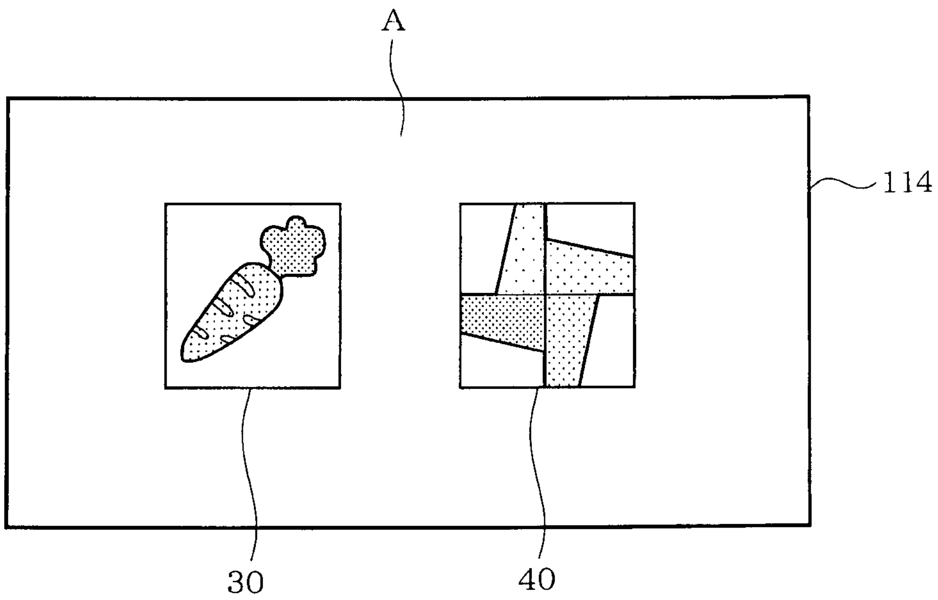
FIG. 6 illustrates an example of a first screen.

Referring now to FIGS. 4 to 26, the flow from selection of a pattern to cutting will be described with particular attention to the control circuit 17. When power is supplied to the cutting apparatus 10, the control circuit 17 executes processing based on a cutting apparatus program, that is, a processing apparatus program (power on). The control circuit 17 proceeds to step S11 to execute a pattern category selecting process. Upon start of the pattern category selecting process, the control circuit 17 displays a first screen A on the input display 114 as shown in FIG. 6. An applique pattern 30 and a patchwork pattern 40 both as selectable pattern categories are displayed on the first screen A, for example.

Each of the applique and patchwork patterns 30 and 40 is composed by combining one or more pattern parts. A pattern part is a pattern which is a minimum unit of element composing the applique or patchwork pattern 30 or 40. A pattern, such as the applique and patchwork patterns 30 and 40, composed by combining a plurality of pattern parts is referred to as a pattern assembly. The user touches the applique pattern 30 or the patchwork pattern 40 on the first screen A to select either pattern. The control circuit 17 determines a pattern category based on the touch operation carried out on the input display 114.

Figure 7:
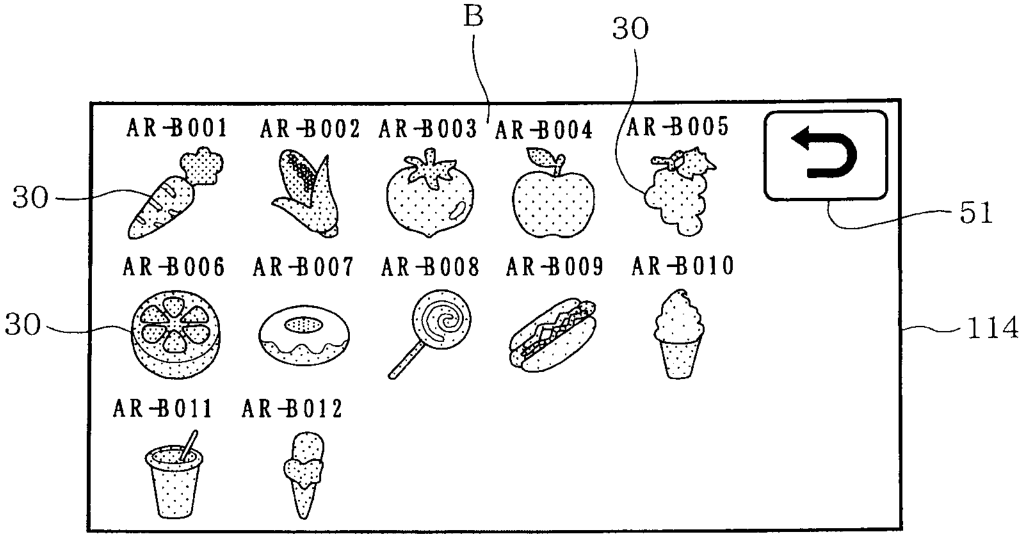
FIG. 7 illustrates an example of a second screen in the case where an applique pattern has been selected.

The control circuit 17 then proceeds to step S12 to execute a pattern selecting process. Firstly, the case where the user has selected the applique pattern 30 at step S11 will be described. Upon start of the pattern selecting process at step S12, the control circuit 17 causes the input display portion 114 to display a second screen B corresponding to a category of the applique pattern 30, as shown in FIG. 7. A plurality of types of applique patterns 30 is displayed on the second screen B. The same symbol is attached to the applique patterns for the sake of simplicity in the description although the applique patterns differ from one another.

The user touches a desired one of the applique patterns 30 to select the pattern on the second screen B. For example, assume that the user selects a right upper pattern of grape. The control circuit 17 then determines the applique pattern, based on the touch operation carried out on the input display screen 114. A “return” button 51 is also displayed on the second screen B as well as the applique patterns 30. When the user touches the “return” button 51, the control circuit 17 returns to the last step, namely, step S11. The “return” button 51 functions in the same manner on other screens.

Figure 8:
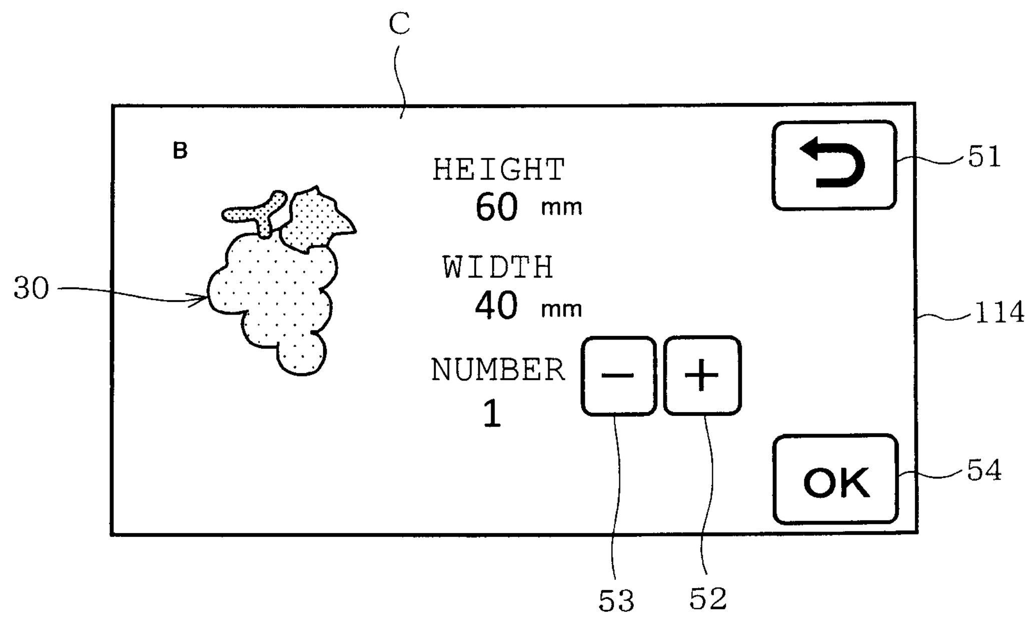
FIG. 8 illustrates an example of a third screen in the case where the applique pattern has been selected.
Figure 9:
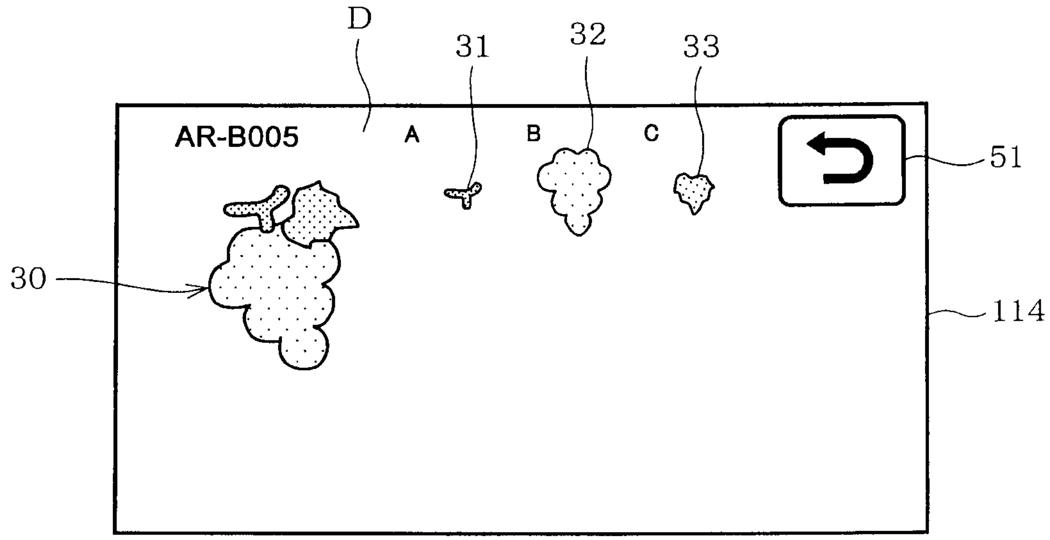
FIG. 9 illustrates an example of a fourth screen in the case where the applique pattern has been selected.

The control circuit 17 then proceeds to step S13 to execute a pattern size setting process. Upon start of the pattern size setting process, the control circuit 17 causes the input display 114 to display a third screen C as shown in FIG. 8. The third display screen C displays the applique pattern 30 selected at step S12 and information about a height and a width both indicating a size of the applique pattern 30 and the number of the applique pattern 30. In this case, the applique pattern 30 displayed on the third screen C is preferably directed as an impression.

The size of the applique pattern 30 can be enlarged or reduced by touching a “plus” button 52 or a “minus” button 53. The user enlarges the applique pattern 30 by touching the “plus” button 52 or reduces the applique pattern 30 by touching the “minus” button 53. Subsequently, when a desirable size of the applique pattern 30 is obtained, the user touches a “determination” button 54, thereby determining the size of the applique pattern 30. The cutting apparatus 10 processes the workpiece 21 so that the workpiece 21 is sized as set by the pattern size setting process.

The control circuit 17 then proceeds to step S14 to execute a pattern part selecting process. The applique pattern 30 is composed by combining three pattern parts with different shapes, that is, a first pattern part 31, a second pattern part 32 and a third pattern part 33. Upon start of the pattern part selecting process, the control circuit 17 causes the input display 114 to display a fourth screen D. The fourth screen D displays the applique pattern 30, the pattern parts 31, 32 and 33 side by side.

Assume now that the pattern parts 31 to 33 are displayed on the fourth screen D so that lengthwise directions of the patterns face or are substantially parallel with a right-left or up-down direction. The user then touches one or more pattern parts 31 to 33 desired to be cut to select the patterns. The control circuit 17 determines one or more pattern parts to be cut, based on the touch operation onto the input display 114.

Figure 10:
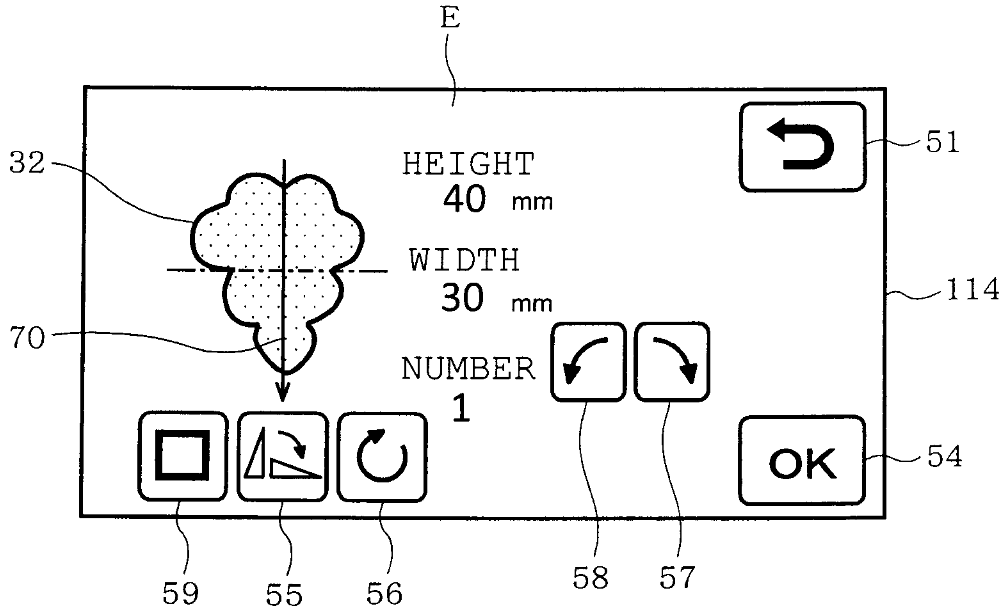
FIG. 10 illustrates an example of a fifth screen in the case where the applique pattern has been selected (No. 1)

The control circuit 17 then proceeds to step S15 to execute a pattern direction setting process. In the pattern direction setting process, a direction of the pattern part 32 is set on the basis of processing data which will be described later or user's operation onto the input display 114. Upon start of the pattern direction setting process, the control circuit 17 causes the input display 114 to display a fifth screen E as shown in FIG. 10.

The control circuit 17 causes the input display 114 to display the pattern part selected at step S14, for example, the pattern part 32 on the fifth screen E so that the pattern part is directed in the same manner as displayed on the fourth screen D. The control circuit 17 further causes the input display 114 to display the pattern part 32 and a first arrow 70 superposed on the pattern part 32 on a fifth screen E, for example. The direction of the first arrow 70 becomes a reference of the direction of the pattern part 32. Furthermore, buttons 55 to 59 for changing the direction of the pattern part 32 are displayed on the fifth screen E. The user can change the direction of the pattern part 32 relative to the first arrow 70 by operating the buttons 55-59.

Figure 11:
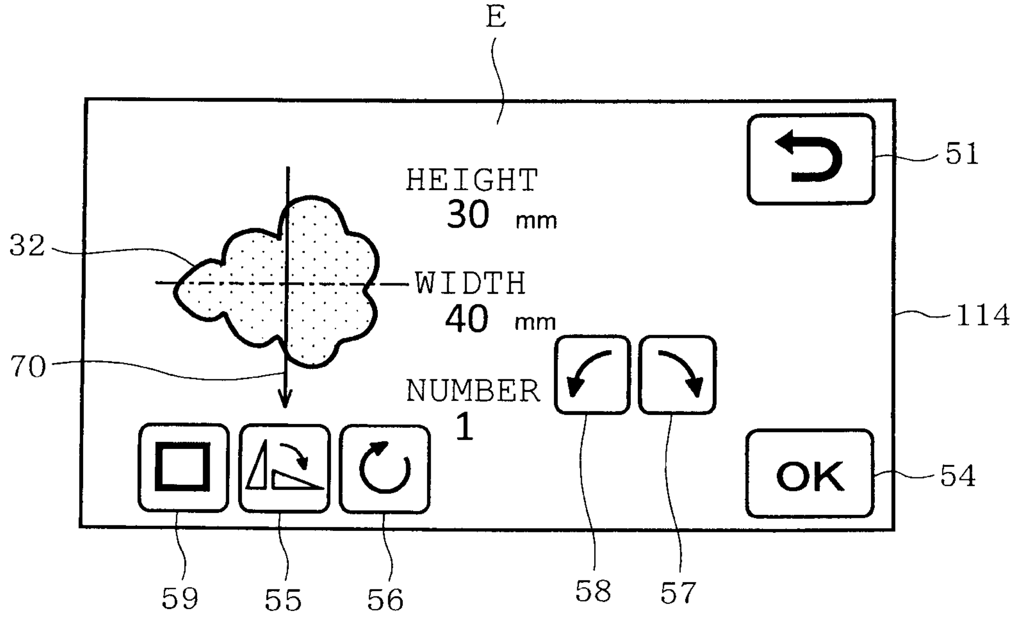
FIG. 11 illustrates an example of the fifth screen in the case where the applique pattern has been selected (No. 2)

More specifically, the direction of the first arrow 70 is fixed on the fifth screen E. When a 90°-rotation button 55 is touched, the control circuit 17 causes the displayed pattern part 32 to be rotated 90° rightward as shown in FIG. 11. Furthermore, when an optional rotation button 56 is touched, the control circuit 17 renders the rightward rotation button 57 or the leftward rotation button 58 operable. When the rightward and leftward rotation buttons 57 or 58 are touched, the pattern part 32 is rotated rightward or leftward by a predetermined angle. When the initial position button 59 is touched, the control circuit 17 returns the pattern part 32 to an initial position, namely, the direction of the initially displayed pattern part 32.

The user touches a determination button 54 after having operated the buttons 55 to 59 so that the direction of the pattern part 32 is changed so as to correspond with the direction specified by the holding member or the workpiece 21. As a result, the control circuit 17 determines the direction of the pattern part 32 based on the touch operation made by the user onto the fifth screen E of the input display portion 114. Note that the direction of the pattern part 32 may be changed by rotating the first arrow 70 with the displayed pattern part 32 being fixed.

Figure 12:
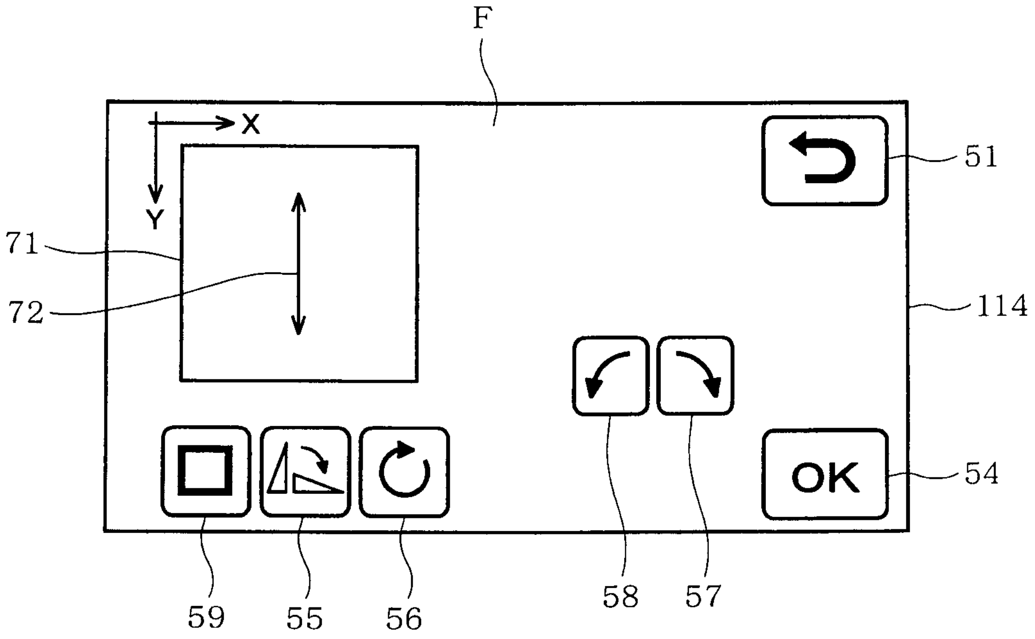
FIG. 12 illustrates an example of a sixth screen in the case where the applique pattern has been selected (No. 1)

The control circuit 17 then proceeds to step S16 to execute a workpiece direction setting process. In the workpiece direction setting process, the control circuit 17 specifies the direction of the workpiece 21 based on the holding member 20 or the workpiece 21 held on the holding member 20, thereby determining the direction of the workpiece 21. Assume now that the workpiece 21 is a piece of cloth which is a fabric made up of warp and woof or cloth or paper having a design such as vertically striped pattern. Upon execution of the workpiece direction setting process, the control circuit 17 controls so that a sixth screen F is displayed on the input display 114, as shown in FIG. 12. A workpiece indication 71 and a second arrow 72 are displayed on the sixth screen F. In this case, the direction indicated by the second arrow 72 is the direction of the workpiece 21. The direction of the workpiece 21 corresponds with the direction of grain of the cloth (the direction in which the warp extends) or the direction in which the warp of the cloth or paper extends. Furthermore, when the workpiece 21 is held on the holding member 20 so that the direction of the workpiece 21 corresponds with the Y direction, for example, the direction of the workpiece 21 may be specified by the direction of the direction of the holding member 20.

X and Y directions displayed on the sixth screen F correspond with the X and Y directions of the cutting apparatus 10 respectively as shown in FIG. 1. More specifically, when the left front end of the holding member 20 disposed on the cutting apparatus 10 shown in FIG. 1 is a reference O, the X direction as shown in FIG. 12 indicates the right direction of the holding member 20 as viewed at the reference O, and the Y direction as shown in FIG. 12 indicates the frontward direction of the holding member 20 as viewed at the reference O.

The user touches one or more of the buttons 55 to 59 on the sixth screen F thereby to change the direction of the second arrow 72, namely, the workpiece 21. More specifically, the direction of the second arrow 72 is changed so as to correspond with the direction of the workpiece 21 held on the holding member 20. In this case, the workpiece indication 71 displayed on the sixth screen F is fixed. The second arrow 72 is rotated based on the touch operation made onto the buttons 55 to 59. For example, when the 90°-rotation button 55 is touched, the second arrow 72 is rotated by 90° rightward to be displayed. When the optional rotation button 56 is touched, the control circuit 17 renders the right and left rotation buttons 57 and 58 operable. Upon receipt of touch operation of the buttons 57 and 58, the second arrow 72 is rotated by a predetermined angle in the right or left direction by a predetermined angle.

The touches the determination button 54 when the direction of the second arrow 72 corresponds with the direction of the workpiece 21, whereby the control circuit 17 determines the direction of the workpiece 21. In this case, the control circuit 17 functions as a setting unit capable of setting the direction of the workpiece 21 according to input entered by the user.

The control circuit 17 then proceeds to step S17 to execute temporary arrangement of the pattern part 32. In the temporary arrangement of the pattern part 32, the arrangement of the pattern part 32 on the workpiece 21 is virtually carried out. Upon start of the temporary arrangement, the control circuit 17 causes the input display 114 to display a seventh screen G. The result of temporary arrangement of the pattern part 32 is displayed on the seventh screen G. In the temporary arrangement, the control circuit 17 arranges the pattern part 32 by causing the direction of the pattern part 32 set at step S15 to correspond with the direction of the workpiece 21 set at step S16. More specifically, the control circuit 17 arranges the pattern part 32 in the temporary arrangement by causing the direction indicated by the first arrow 70 to correspond with the direction indicated by the second arrow 72. In this case, the control circuit 17 functions as a first arrangement unit which arranges the pattern part 32 by causing the direction of the pattern part 32 to correspond with the direction of the workpiece 21. The input display 114 functions as a display unit which displays the arranged state of the pattern part 32 on the workpiece 21.

Figure 14:
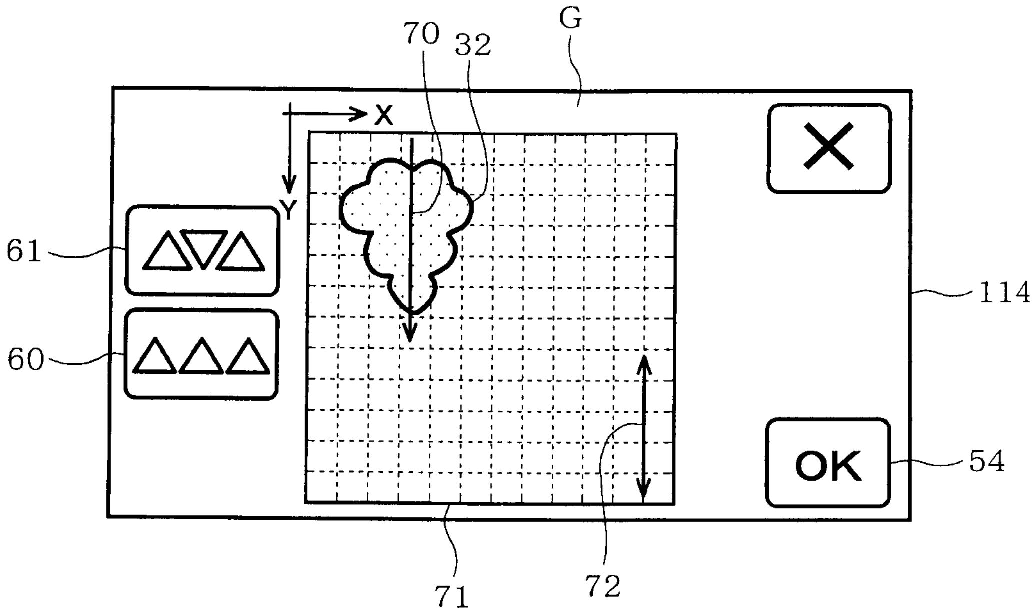
FIG. 14 illustrates an example of a seventh screen in the case where the applique pattern has been selected (No. 1)
Figure 15:
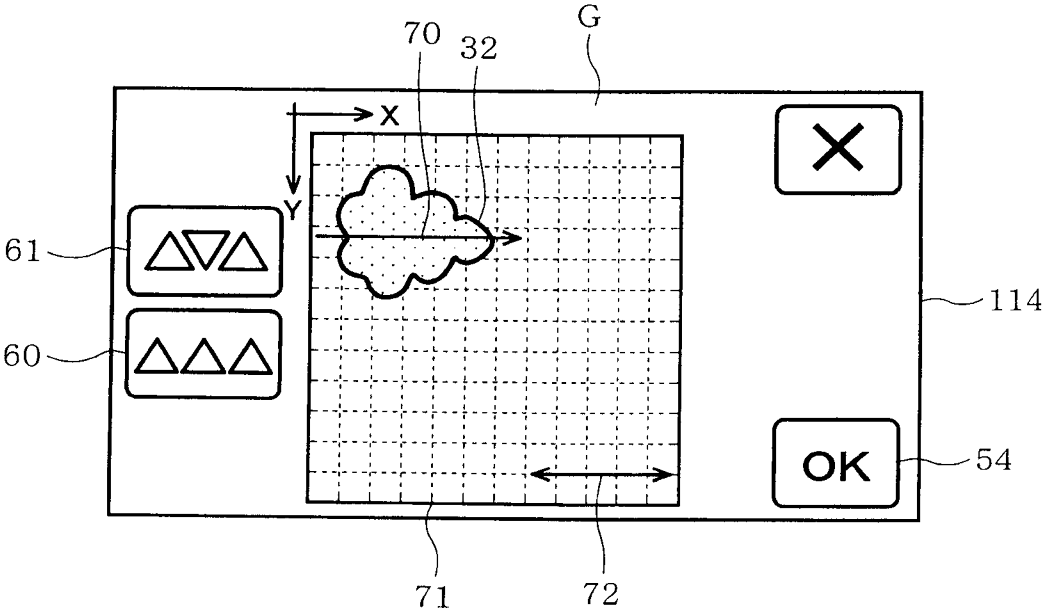
FIG. 15 illustrates an example of the seventh screen in the case where the applique pattern has been selected (No. 2)

For example, the direction of the pattern part 32 is set as shown in FIG. 10, and the direction of the workpiece 21, namely, the direction of the second arrow 72 are set so as to correspond with the Y direction of the cutting apparatus 10 as shown in FIG. 12. In this case, the pattern part is arranged so that the direction of the first arrow 70 corresponds with the Y direction of the cutting apparatus 10 as shown in FIG. 14. On the other hand, when the direction of the workpiece 21 is set so as to correspond with the X direction of the cutting apparatus 10, the pattern part 32 is arranged so that the direction of the first arrow 70 corresponds with the X direction of the cutting apparatus 10 as shown in FIG. 15.

When viewing the result of temporary arrangement of the pattern part 32 displayed on the seventh screen G, the user touches the determination button 54 in the case where the displayed arrangement need not be changed. On the other hand, when the arrangement needs to be changed, the user touches a rearrangement mode buttons 60 and 61 to select a rearrangement mode. When determining at step S18 that the rearrangement mode has been selected (YES), the control circuit 17 proceeds to step S19 to execute a rearrangement process. The rearrangement process will be described later.

On the other hand, when determining at step S15 that the rearrangement mode has not been selected (NO), the control circuit 17 proceeds to step S20 to determine whether or not the determination button 54 has been touched. When the determination button 54 is not touched on the seventh screen G, the control circuit 17 repeatedly executes steps S18 to S20 until the determination button 54 is touched.

When determining at step S20 that the determination button 54 has been touched (YES), the control circuit 17 proceeds to step S21 to determine the arrangement of the pattern part 32 displayed on the seventh screen G. Subsequently, the control circuit 17 proceeds to step S22 to drive the motors 133, 143 and 152 to cut the workpiece 21 into the configuration of the pattern part 32. The control circuit 17 completes a sequence of control after the pattern part 32 has been cut.

Next, the case where the user selects the patchwork pattern 40 at step S11 will be described together with detailed description of rearrangement process. When the patchwork pattern 40 has been selected.

Figure 16:
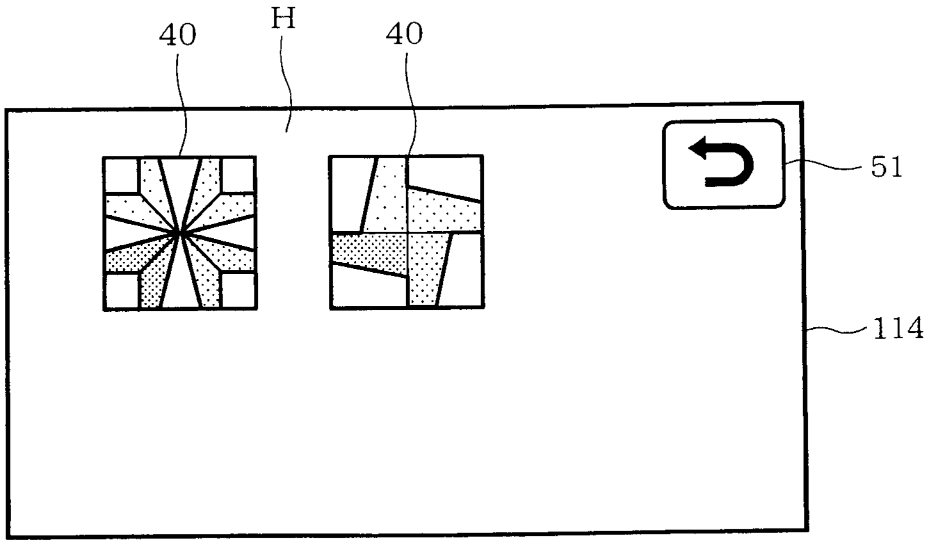
FIG. 16 illustrates an example of an eighth screen in the case where a patchwork pattern has been selected.

When the patchwork pattern 40 has been selected at step s11, the control circuit 17 causes the input display 114 to display an eighth screen H corresponding to the patchwork pattern 40 shown in FIG. 16 in the pattern selecting process at step S12. A plurality of, for example, two types of patchworks 40 are displayed. Although two types of patchwork patterns 40 as shown in FIG. 16 differ from each other, the same reference symbols are affixed for the sake of easiness in the explanation.

Figure 17:
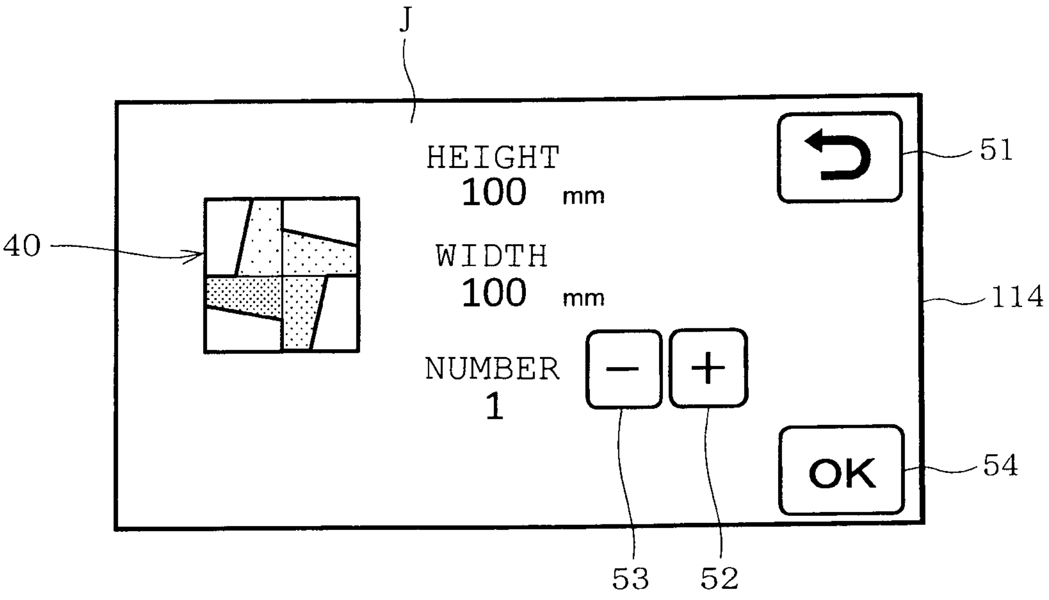
FIG. 17 illustrates an example of a ninth screen in the case where a patchwork pattern has been selected.
Figure 18:
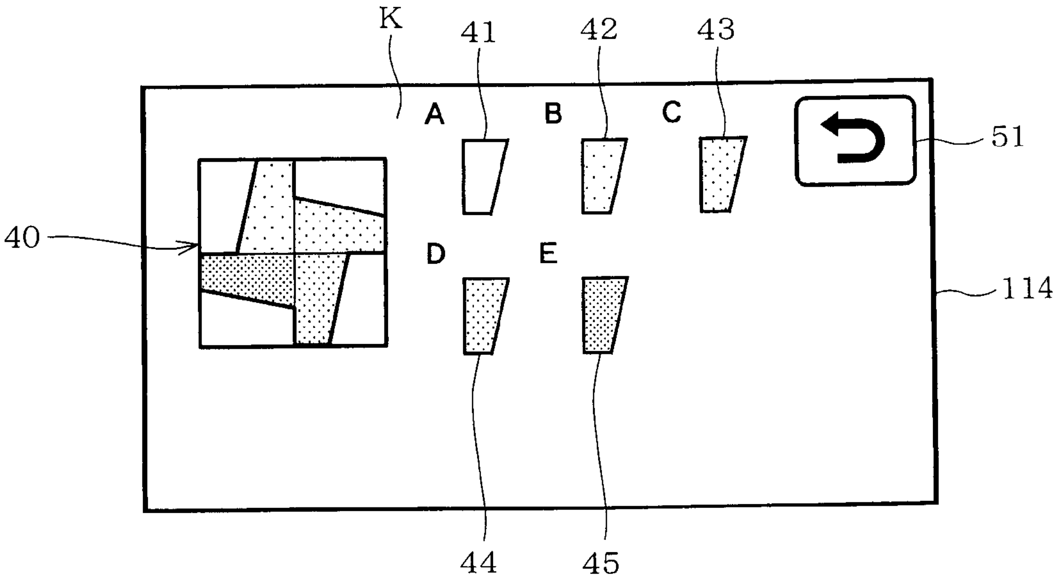
FIG. 18 illustrates an example of a tenth screen in the case where a patchwork pattern has been selected.

When the right patchwork pattern 40 is selected on the eighth screen H shown in FIG. 16, the control circuit 17 executes the pattern size setting process at step S13, causing the input display 114 to display a ninth screen J shown in FIG. 17. The user sets the size of the patchwork 40 in the same manner as the applique pattern 30. Next, the control circuit 17 causes the input display 114 to display a tenth screen K in the pattern part selecting process at step S14, as shown in FIG. 18. The tenth screen K displays the patchwork pattern 40, a first pattern part 41, a second pattern part 42, a third pattern part 43, a fourth pattern part 44 and a fifth pattern part 45, all composing the patchwork pattern 40, side by side on the same tenth screen K.

In this case, the patchwork pattern 40 is composed by combining the pattern parts 41 to 45 having the same configuration and different colors. More specifically, the patchwork pattern 40 is composed of four white-colored first pattern parts 41 and red, yellow, blue and green pattern parts 42 to 45, for example. The pattern parts 41 to 45 are displayed on the tenth screen K in a manner such that the colors of the pattern parts 41 to 45 are discriminable. The user touches and selects the pattern part desired to be cut, in the same manner as the applique pattern 30.

Figure 19:
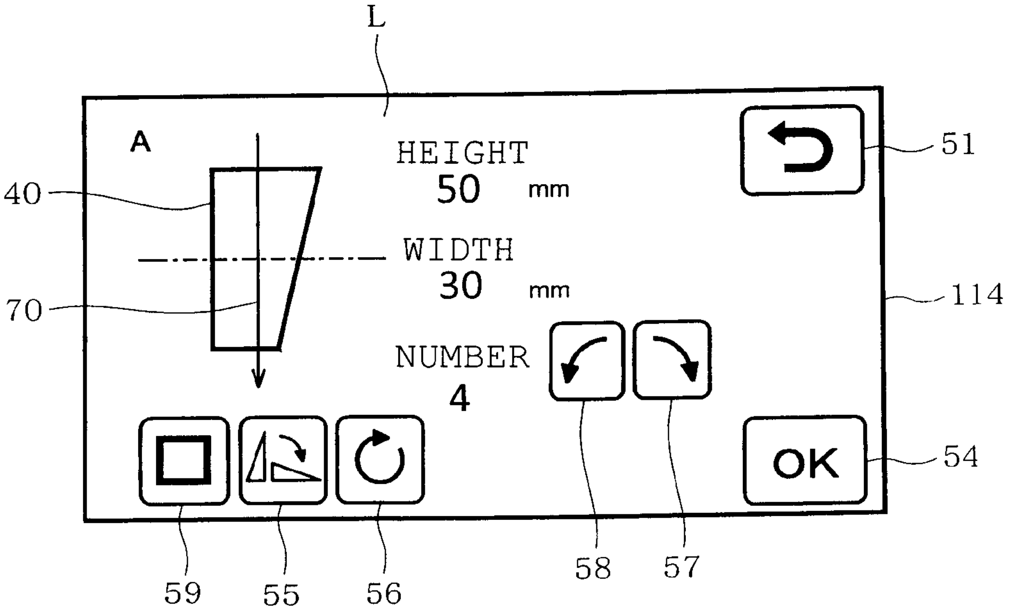
FIG. 19 illustrates an example of an eleventh screen in the case where a patchwork pattern has been selected.

Next, the control circuit 17 causes the input display 114 to display an eleventh screen L shown in FIG. 19 in the pattern direction setting process at step S15. For example, when the first pattern parts 41 have been selected at step s14, the control circuit 17 causes the input display 114 to display the first pattern parts 41, the height, width and number of the pattern part on the eleventh screen L. The user sets the direction of the pattern parts 41 in the pattern direction setting process at step S15 in the same manner as the above-described applique pattern 30. Next, the user sets the direction of the workpiece 21 in the object direction setting process at step S16 in the same manner as the above-described applique pattern 30.

Figure 13:
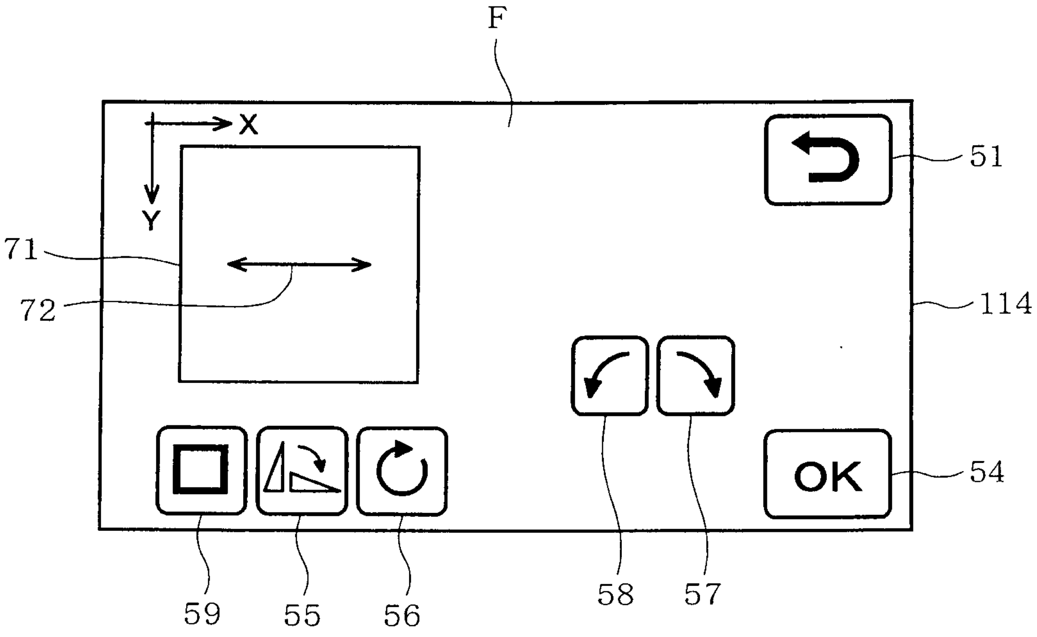
FIG. 13 illustrates an example of the sixth screen in the case where the applique pattern has been selected (No. 2)
Figure 20:
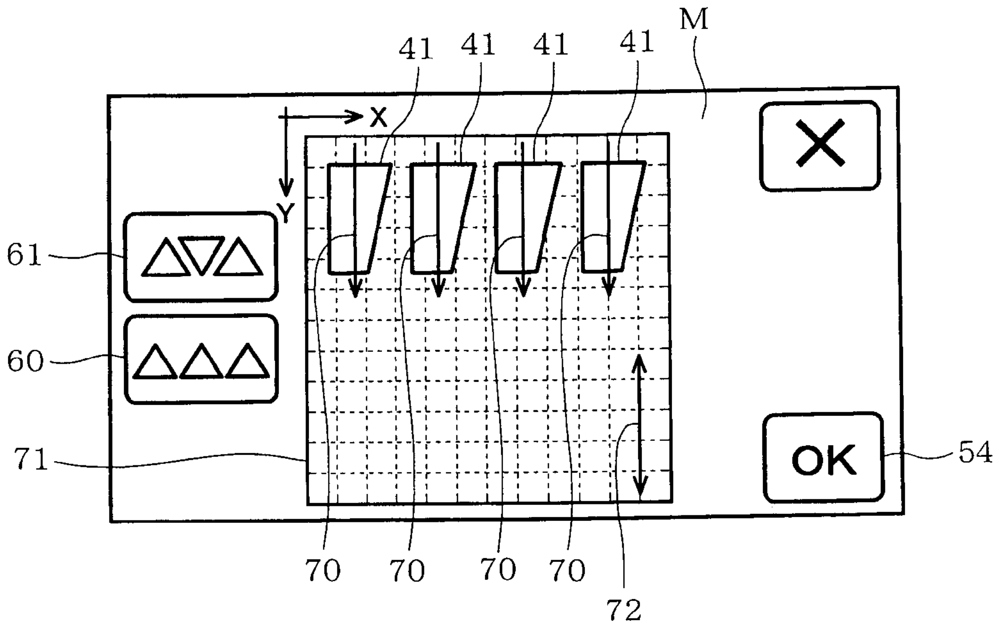
FIG. 20 illustrates an example of a twelfth screen in the case where a patchwork pattern has been selected (No. 1)
Figure 21:
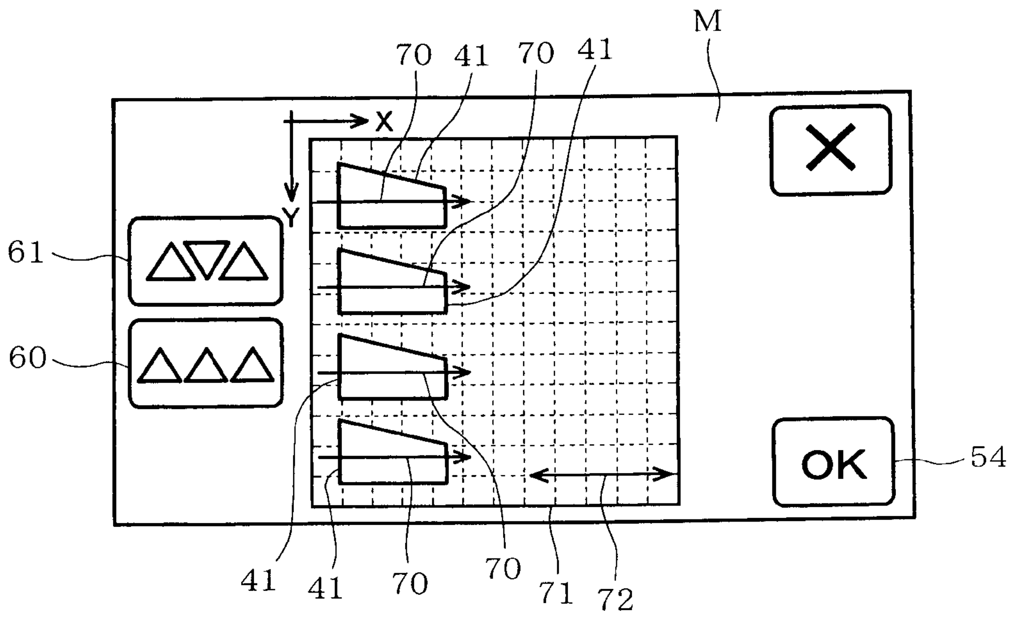
FIG. 21 illustrates an example of a twelfth screen in the case where a patchwork pattern has been selected (No. 2)
Figure 22:
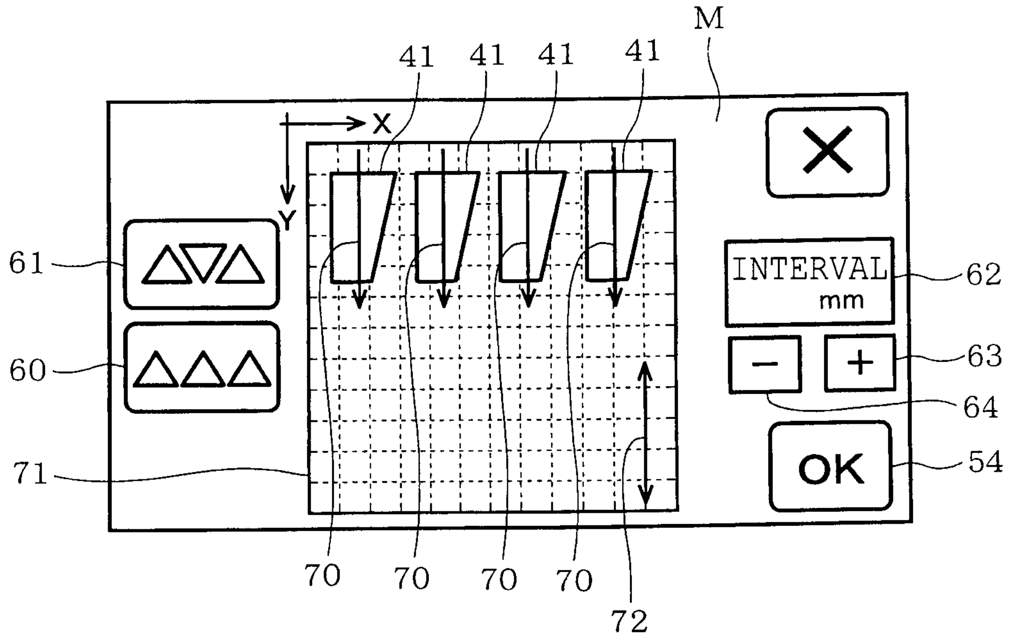
FIG. 22 illustrates an example of the twelfth screen in the case where an arrangement interval setting process has been executed by execution of a rearrangement process.

Next, the control circuit 17 executes temporary arrangement of the pattern parts 41 by the temporary arrangement process at step S17. In this case, too, the control circuit 17 arranges the pattern part 32 by causing the direction indicated by the first arrow 70 to correspond with the direction indicated by the second arrow 72 in the same manner as the applique pattern 40. For example, when the direction of the pattern parts 41, namely, the first arrow 70 are set as shown in FIG. 19 and the direction of the workpiece 21 corresponds with the Y direction of the cutting apparatus 10 as shown in FIG. 12, the pattern parts 41 are arranged so that the direction of the first arrow 70 corresponds with the Y direction, as shown in FIG. 20. On the other hand, when the direction of the workpiece 21 is directed in Y direction of the cutting apparatus 10 as shown in FIG. 13, the pattern parts 41 are arranged so that the first arrow 70 corresponds with the X direction, as shown in FIG. 21. In this case, the control circuit 17 functions as a first arrangement unit which arranges the pattern parts 41 so that the direction of the pattern parts 41 corresponds with the direction of the workpiece 21. The input display 114 functions as a display unit which displays an arranged state of the pattern parts 41 on the workpiece 21.

When there is a plurality of partial patters having the same configuration such as the pattern parts 41, the control circuit 17 temporarily arranges a plurality of, four in the embodiment, pattern parts 41 so that the pattern parts 41 are lined at regular intervals in one direction, for example, in a widthwise direction of the pattern parts 41, as shown in FIG. 20 or 21. The spacing between adjacent pattern parts 41 arranged in the temporary arrangement process is set at a predetermined distance.

The temporary arrangement process is executed at step S17 as described above. Thereafter, when determining that a change in the arrangement of the pattern parts 42 is necessary, the user touches the rearrangement mode buttons 60 and 61 to select the rearrangement mode. The rearrangement mode includes a 0°-fixed mode and 0°/180°-rotation mode. In this case, the 0°-fixed mode is selected when the rearrangement mode button 60 is touched. The 0°/180°-rotation mode is selected when the other rearrangement mode button 61 is touched. The control circuit 17 executes the rearrangement process as shown in FIG. 5 when the 0°-fixed mode or the 0°/180°-rotation mode is selected. As a result, the control circuit 17 adjusts the spacing between the adjacent pattern parts 41 and rearranges the pattern parts based on the selected rearrangement mode.

More specifically, when the rearrangement mode is selected and executed, the control circuit 17 executes an arrangement interval setting process at step S31. Upon execution of the arrangement interval setting process, the control circuit 17 causes the input display 114 to display, on a twelfth screen M, an interval indication indicative of an interval of the adjacent pattern parts 41. The user then touches the plus button 63 or the minus button 64 to increase or reduce the interval between the adjacent pattern parts 41. In this case, the control circuit 17 functions as an interval setting unit which is capable of setting an interval between the adjacent pattern parts 41 when a plurality of pattern parts is arranged. Subsequently, when the user touches the determination button 54 thereby to determine the intervals of the pattern parts 41, the control circuit 17 proceeds to step S32.

Figure 23:
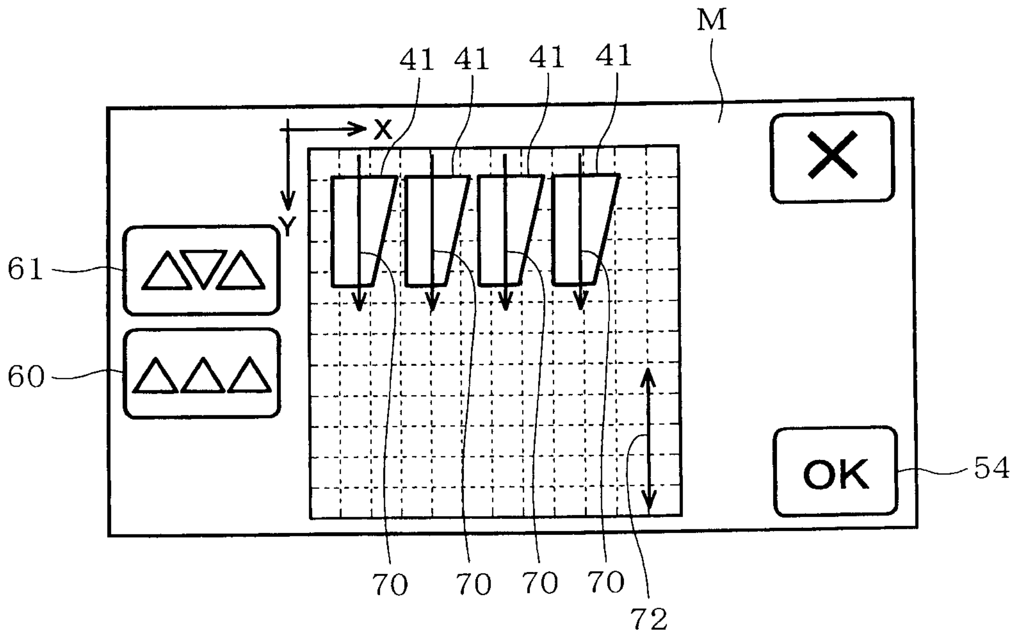
FIG. 23 illustrates an example of the twelfth screen in the case where the rearrangement process has been executed for the arrangement of FIG. 20 in a 0°-fixed mode.

At step S32, the control circuit 17 determines the type of the rearrangement mode. When the selected rearrangement mode is the 0°-fixed mode, the control circuit 17 proceeds to step S33 to execute the rearrangement process in the 0°-fixed mode. In the 0°-fixed mode, the control circuit 17 changes the interval between the adjacent pattern parts 41 to the interval set by the arrangement interval setting process at step S31, thereby rearranging the pattern parts 41, as shown in FIG. 23. Thus, in the 0°-fixed mode, a rotational angle of the pattern parts 41 is fixed to 0° and the directions of the pattern parts 42 are not changed. More specifically, the control circuit 17 functions as a rearrangement unit which rearranges the pattern parts 41 based on the intervals set by the interval setting unit.

Furthermore, when the 0°/180°-rotation mode has been selected, the control circuit 17 proceeds to step S34 to execute the rearrangement process in the 0°/180°-rotation mode. In the 0°/180°-rotation mode, the control circuit 17 changes the interval between adjacent pattern parts 41 to a distance set at the arrangement interval setting process at step S31. Furthermore, the control circuit 17 rotates the directions of pattern parts 41 alternately by 180°, thereby rearranging the pattern parts. More specifically, the pattern parts are arranged so as to be directed in the front-back direction alternately relative to the direction of the workpiece 21. In this case, the control circuit 17 functions as a second arrangement unit which arranges the pattern parts 41 by rotating the direction of the pattern parts 41 by 180° relative to the direction of the workpiece 21 according to input by the user.

Figure 25:
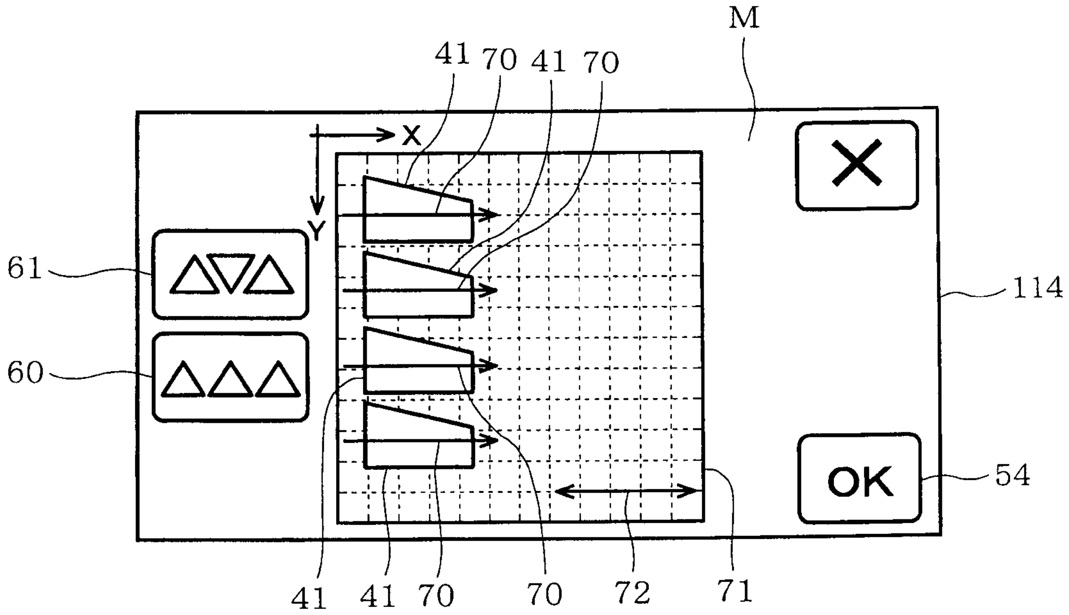
FIG. 25 illustrates an example of the twelfth screen in the case where the rearrangement process has been executed for the arrangement of FIG. 21 in a 0°-fixed mode.
Figure 26:
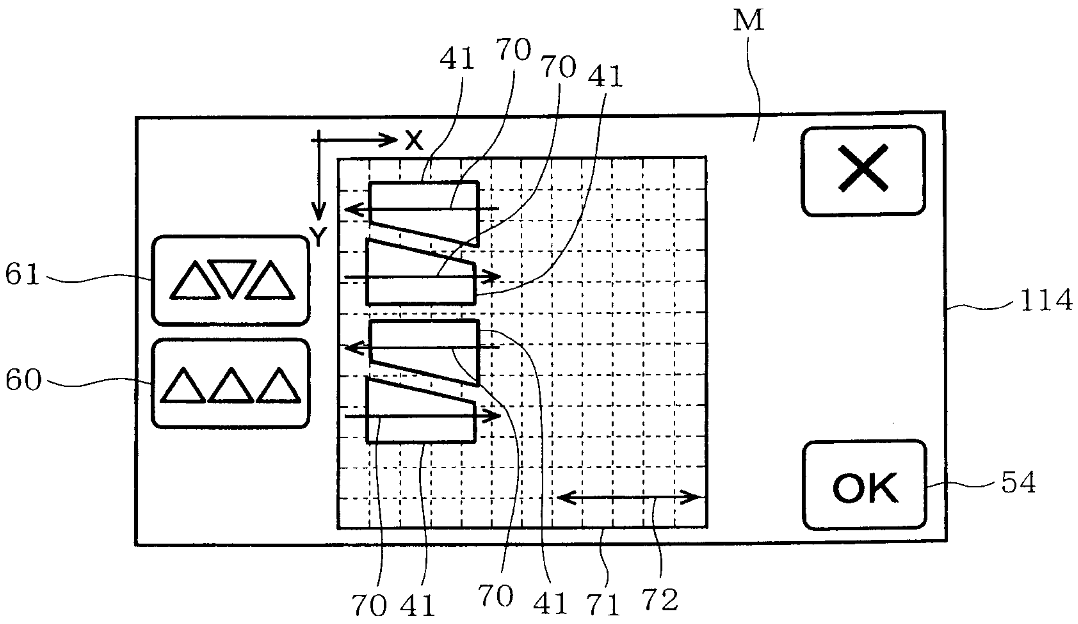
FIG. 26 illustrates an example of the twelfth screen in the case where the rearrangement process has been executed for the arrangement of FIG. 21 in a 0°/180°-rotation mode.

When the pattern parts 41 are lined up in the Y direction by the temporary arrangement process at step S17 as shown in FIG. 21 and the 0°-fixed mode is selected, the arrangement as shown in FIG. 25 is obtained. In this case, the directions of the pattern parts 41 are the same in the right direction relative to the workpiece 21. On the other hand, when the 0°/180°-rotation mode is selected, an arrangement as shown in FIG. 26 is obtained. In this case, the directions of the pattern parts 41 are arranged mutually in the right-left direction.

Figure 4:
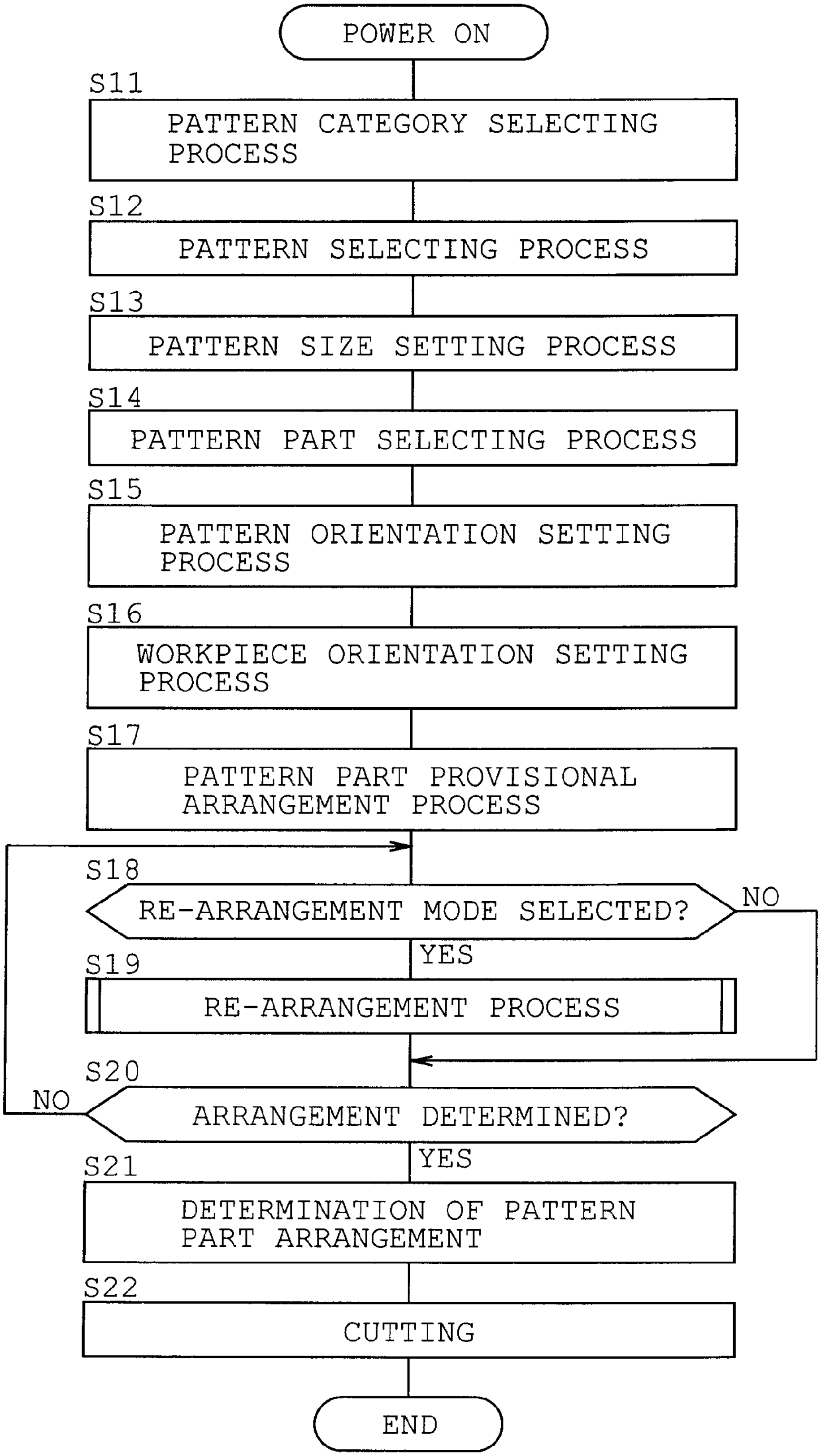
FIG. 4 is an example of a first flowchart showing control contents of a control circuit.

The control circuit 17 rearranges the pattern parts 41 in the selected rearrangement mode at steps S33 and S34, thereafter proceeding to step S20 as shown in FIG. 4 (RETURN). The user confirms the result of rearrangement of the pattern parts 41 and touches the rearrangement mode buttons 60 and 61 when determining that further change is necessary, selecting the rearrangement mode again. Furthermore, when viewing the result of temporary arrangement of the pattern part 32 displayed on the twelfth screen G and determining that no further change in the arrangement is necessary, the user touches the determination button 54.

The control circuit 17 determines at step S20 whether or not the determination button 54 has been touched. When the determination button 54 has not been touched, the control circuit 17 repeatedly executes steps S18 to S20 until the determination button 54 is touched. On the other hand, when determining at step S20 that the determination button 54 has been touched (YES), the control circuit 17 proceeds to step S21 to determine the arrangement of the pattern parts 41 displayed on the arrangement result screen G. Subsequently, the control circuit 17 proceeds to step S22 to drive the motors 133, 143 and 152 in order that the workpiece 21 may be cut into the configuration of the pattern part 41. The control circuit 17 completes a sequence of control after the pattern part 41 has been cut.

Next, the following describes cutting of the applique and patchwork patterns 30 and 40 by the cutting apparatus 10 and a concrete manner of display on the input display 114 with the use of the patchwork pattern 40 as shown in FIG. 17. The cutting apparatus 10 includes the RAM 181 storing pattern data Dat as shown in FIG. 27 as information about cutting and display of the patchwork pattern 40. The pattern data Dat of the patchwork pattern 40 has type number data Da, total number data Db, color data Dc1 to Dc5, processing data Dd1 to Dd5, number data De1 to De5 and display position data Df1 to Df5.

The type number data Da is indicative of a total number of types of pattern parts composing the patchwork pattern 40. In the case of the patchwork pattern 40, the pattern parts composing the patchwork patterns include the first pattern part 41, the second pattern part 42, the third pattern part 43, the fourth pattern parts 44 and the fifth pattern part 45, with the result that the type number data Da is five.

The total number data Db is indicative of the total number of the pattern parts 41 composing the patchwork pattern 40. In this case, the patchwork pattern 40 is composed of four first pattern parts 41 and four pattern parts 42 to 45 with the result that the total number data Db is eight. The color data Dc1 to Dc5 correspond to the pattern parts 41 to 45 respectively and are indicative of the colors in displaying the pattern parts 41 to 45 on the input display 114 respectively.

The number data De1 to De5 are indicative of the pattern parts of the same type in the pattern parts composing the patchwork pattern 40. More specifically, the number data De1 to De5 are indicative of the numbers of the respective pattern parts 41 to 45 composing the patchwork pattern 40. In this case, the number data of the first pattern parts 41 is four. Furthermore, the number data De2 to De5 of the other pattern parts 42 to 45 are all one.

The processing data Dd1 to Dd5 define the configurations and the directions at the initial state regarding the pattern parts 41 to 45 respectively. More specifically, the processing data Dd1 to Dd5 correspond to the pattern parts 41 to 45 respectively. The configurations of the pattern parts 41 to 45 are defined by the processing data Dd1 to Dd5 respectively. The processing data Dd1 to Dd5 composing the pattern data Dat are used for the cutting of the pattern parts 41 to 45 respectively. In this case, the pattern parts 41 to 45 have the same configuration although having different colors. Accordingly, the processing data Dd1 to Dd5 defining the configurations of the pattern parts 41 to 45 are composed of the same processing data Cut.

Figure 28:
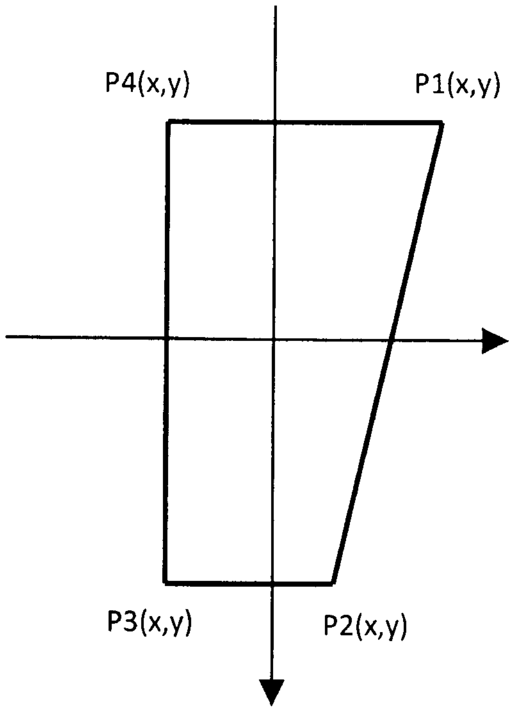
FIG. 28 is an example of a conceptual diagram of configuration of coordinate data.

Each of the processing data Dd1 to Dd5 or the processing data Cut has a plurality of coordinate data P, line type information and line number information. The coordinate data P is indicative of a two-dimensional coordinate system or in this case, points represented on an X-Y plane of orthogonal system, as shown in FIG. 28. The coordinate data indicates intersections of straight lines composing the pattern parts 41 to 45, for example, in the case of a configuration composed of straight lines, such as pattern parts 41 to 45. In this case, the processing data Cut has, as coordinate data P, first coordinate data P1, second coordinate data P2, third coordinate data P3 and fourth coordinate data P4. Furthermore, orientations of pattern parts 41 to 45 are set to the Y direction, namely, down direction in FIG. 28 as an initial orientation.

The line type information indicates types of lines connecting between points represented as coordinate data P1 to P4. The line type information is set to straight line in the processing data Cut indicative of the pattern parts 41 to 45. The line number information indicates the number of lines connecting between coordinate data P1 to P4. In this case, the line number information is set to 4. The cutting apparatus 10 moves the workpiece 21 and the carriage 15 relative to each other based on the processing data Cut, thereby cutting the pattern parts 41 to 45. More specifically, the control circuit 17 drives the X-axis and Y-axis moving mechanisms 13 and 14 to linearly move the carriage 15 relative to the workpiece 21 from a start point P1 to next points P2, P3 and P4 and thereafter from point P4 to the start point P1, whereby the pattern parts 41 to 45 are cut out of the workpiece 21.

A manner of displaying the patchwork pattern 40 and the pattern parts 41 to 45 on the input display 114 will be described. For example, the pattern parts 41 to 45 as shown in FIG. 18 are displayed based on the color data Dc1 to Dc5 and processing data Dd1 to Dd5. On the other hand, the patchwork 40 is displayed based on display position data Df1 to Df5 in addition to the color data Dc1 to Dc5 and processing data Dd1 to Dd5. The display position data Df1 to Df5 are used to display the pattern parts 41 to 45 on the input display 114 by rotating and translating the pattern parts 41 to 45.

The display position data Df1 to Df5 are composed of matrix elements a1, a21, a12, a22, a13 and a23 of first and second rows in matrix elements of a 3×3 matrix presented as equation (1) which is used to carry out a known affine transformation. Since four first pattern parts are employed, each of the other pattern parts has display position data composed of predetermined matrix elements although the display position data is eliminated in FIG. 27. Rotational angles and positions of the pattern parts 41 to 45 composing the patchwork pattern 40 are determined by the matrix elements a11, a21, a12, a22, a13 and a23. In equation (1), symbols Px and Py designate x coordinates and y coordinates of points P1 to P4 before execution of the affine transformation, that is, coordinate data P1 to P4. Symbols Qx and Qy designate x coordinates and y coordinates of points P1 to P4 after execution of the affine transformation.

$$\begin{bmatrix} Qx \\ Qy \\ 1 \end{bmatrix} = \begin{bmatrix} a11 & a12 & a13 \\ a21 & a22 & a23 \\ 0 & 0 & 1 \end{bmatrix} \times \begin{bmatrix} Rx \\ Py \\ 1 \end{bmatrix} \tag{1}$$

For example, as shown in FIGS. 18 and 19, the control circuit 17 determines configurations of the pattern parts 41 to 45 inclusive of positions, based on the processing data Dd1 to Dd5. The control circuit 17 colors the pattern parts 41 to 45 and causes the input display 114 to display the colored pattern parts 41 to 45, based on the color data Dc1 to Dc5. Furthermore, as shown in FIG. 19, the control circuit 17 causes the input display 114 to display the number of the pattern parts 41 to 45, based on the number data De1 to De5 of the pattern parts 41 to 45.

On the other hand, when the patchwork pattern 40 is displayed on the input display 114, the control circuit 17 applies the affine transformation to the processing data Dd1 to Dd5 thereby to rotate and translate the processing data Dd1 to Dd5. As a result, the control circuit 17 defines configurations of the pattern parts 41 to 45 including rotational and display positions. The control circuit 17 then combines the pattern parts 41 to 45 rotated and translated thereby to compose the patchwork pattern 40 and further colors the pattern parts 41 to 45, causing the input display 114 to display the patchwork pattern 40. In this case, the control circuit 17 functions as a display control unit which causes the input display 114 to display the patchwork pattern 40 based on the pattern data Dat.

According to the above-described configuration, the control circuit 17 functioning as the first arrangement unit arranges the pattern parts 41 to 45 by conforming the orientations of the pattern parts 41 to 45 to the orientation of the workpiece 21 specified from the holding member 20 or the workpiece 21 held on the holding member 20. In this case, the orientations of the pattern parts 41 to 45 are set on the basis of the processing data Dd1 to Dd5 or set by the user. Accordingly, the orientations of the pattern parts 41 to 45 can be conformed to the orientation of the workpiece 21 irrespective of the orientation of the workpiece 21. Consequently, the orientations of the pattern parts 41 to 45 to be arranged on the workpiece 21 in the processing can be easily conformed to the orientation specified from the holding member 20 or the workpiece 21. This requires no relationship between the orientations of the pattern parts 41 to 45 and the cloth or fabric or the design even when the workpiece 21 is a piece of cloth or fabric or has a design. Consequently, the usability of the cutting apparatus can be improved.

Figure 24:
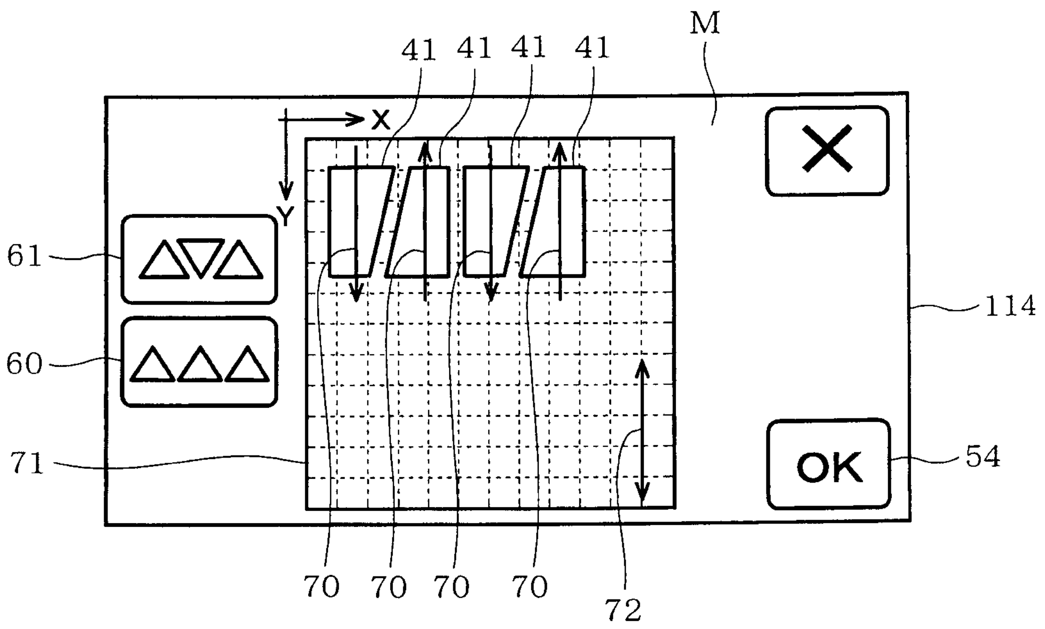
FIG. 24 illustrates an example of the twelfth screen in the case where the rearrangement process has been executed for the arrangement of FIG. 20 in a 0°/180°-rotation mode.

When the control circuit 17 serves as the second arrangement unit, the user can arrange the pattern parts 41 to 45 while the orientations of the pattern parts 41 to 45 are rotated 180° relative to the orientation of the workpiece 21. According to this configuration, as shown in FIGS. 24 and 26, when a plurality of pattern parts 41 having the same configuration are to be continuously arranged, the pattern parts can be arranged so as to close to each other. Consequently, a remaining part of the workpiece 21 from which the pattern parts 41 have been cut, that is, a part of the workpiece 21 to be disposed of can be reduced.

When the control circuit 17 serves as the setting unit, the user can set the workpiece 21 to a desired orientation. According to this configuration, for example, the orientation of the pattern part 41 can be set independent of the orientation of the workpiece 21 disposed on the cutting apparatus 10. As a result, the user can easily set the orientations of the pattern part 41 and the workpiece 21. This can also improve the usability of the cutting apparatus.

When the control circuit 17 serves as the interval setting unit and the re-arrangement unit, the user can re-set the intervals of the four provisionally arranged pattern parts 41 thereby to re-arrange the pattern parts 41. According to this configuration, the user can easily re-arrange the pattern parts when unsatisfied with the provisionary arrangement. This can further improve the usability of the cutting apparatus.

The cutting apparatus 10 includes the input display 114 as a display unit which displays the arranged state of the pattern part 41, for example. According to this configuration, the user can easily confirm the arranged state of the pattern part 41.

The pattern assembly such as the applique pattern 30 or the patchwork pattern 40 includes the pattern data Dat including the processing data Dd defining the configurations of the pattern parts composing the pattern assembly, the number data De indicative of the number of the same type of pattern parts composing the pattern assembly and the display position data for displaying the pattern parts on the input display 114. The control circuit 17 causes the input display 114 to display the pattern assembly such as the applique pattern 30 or the patchwork pattern 40 as a completed form of the pattern, based on the pattern data Dat. According to this configuration, the cutting apparatus 10 is not required to store processing data with respect to all the pattern parts on the RAM 181 when a plurality of pattern parts composing the applique pattern 30 or the patchwork pattern 40 have the same configuration. This can reduce data capacity of the cutting apparatus.

The control circuit 17 causes the input display 114 to display, on the same screen thereof, the pattern assembly such as the patchwork pattern 40 as a completed form and the pattern parts 41 to 45 composing the pattern assembly. According to this configuration, the user can easily confirm the pattern parts composing the patchwork pattern 40 with the result that the usability of the cutting apparatus can be further improved.

The control circuit 17 causes the input display 114 to display the number of the pattern parts 41 to 45 based on the number data De1 to De5. According to this configuration, the user can determine the number of pattern parts requiring processing regarding the pattern parts 41 to 45 with the result that the usability of the cutting apparatus can be further improved.

The above-described example should not be restrictive but may be expanded or modified without departing from the gist. For example, the cutting apparatus 10 cutting the object should not be restrictive. The disclosure may be applied to a drawing apparatus which draws on the sheet-shaped cloth or paper. In this case, the drawing apparatus includes a pen cartridge having a pen, instead of the cutter cartridge 16 having the cutter 161.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. An apparatus comprising:
a cartridge configured to receive a pen or a cutter;
a receiving mechanism configured to receive an object;
a first moving mechanism configured to move the cartridge in a predetermined first movement direction;
a second moving mechanism configured to move the object in a second direction perpendicular to the predetermined first movement direction;
a third moving mechanism configured to move the cartridge in a direction such that the cartridge comes close to the receiving mechanism; and
a processor configured to instruct the apparatus to:
set an orientation of a pattern to be formed on the object, based on pattern data;
arrange the pattern while conforming the orientation of the pattern to an orientation of the object;
drive the first and second moving mechanisms according to the orientation of the pattern and the pattern data; and
drive the third moving mechanism to cause the cartridge to move in a direction such that the cartridge comes close to the receiving mechanism.

2. The apparatus according to claim 1, further comprising:
a display,
wherein the processor is configured to further instruct the apparatus to:
instruct the display to display the pattern to be formed on the object and an arrow indicative of the orientation of the object according to the pattern data,
wherein the setting unit the orientation of the pattern comprises setting the arrow indicative of the orientation of the pattern, and
wherein the arranging the pattern comprises arranging the pattern conforming the arrow indicative of the orientation of the pattern to the orientation of the object.

3. The apparatus according to claim 1,
wherein the processor is configured to further instruct the apparatus to:
receive selection of one of a plurality of pattern parts, the pattern comprising the plurality of pattern parts,
wherein the setting the orientation of the pattern comprises setting an orientation of the selected pattern part, and
wherein the arranging the pattern comprises arranging the pattern part conforming the orientation of the pattern part to the orientation of the object.

4. The apparatus according to claim 1,
wherein a plurality of the patterns is combined into a pattern assembly, and
wherein the setting the orientation of the pattern comprises setting orientations of the plurality of patterns.

5. The apparatus according to claim 1,
wherein the processor is configured to further instruct the apparatus to:
arrange the pattern while the orientation of the pattern is rotated 180° relative to the object.

6. The apparatus according to claim 1,
wherein the setting the orientation of the pattern comprises setting the orientation of the pattern to a desired orientation.

7. The apparatus according to claim 1,
wherein the processor is configured to further instruct the apparatus to:
set an interval of the adjacent patterns when a plurality of the patterns is arranged; and
re-arrange the patterns based on the interval.

8. The apparatus according to claim 1, further comprising:
a display,
wherein the processor is configured to further instruct the apparatus to:
display an arranged state of the pattern on the object.

9. The apparatus according to claim 1, further comprising:
a memory configured to store processing data representing a pattern assembly,
wherein the processing data comprises:
a plurality of the pattern data representing a plurality of the patterns to be formed on the object; and
number data indicative of the pattern data; and
display position data representing positions for displaying the plurality of patterns on a display.

10. The apparatus according to claim 9, wherein the pattern data comprises color data indicative of colors in which the pattern is displayed on a display.

11. The apparatus according to claim 10, further comprising:
a display,
wherein the processor is configured to further instruct the apparatus to:
instruct the display to display the pattern assembly, based on the processing data.

12. The apparatus according to claim 11,
wherein the instructing the display the pattern assembly comprises instructing the display to display the plurality of the patterns comprised in the pattern assembly together with the pattern assembly side by side on the same screen in the display, based on the plurality of the pattern data and display position data.

13. The apparatus according to claim 11,
wherein the instructing the display the pattern assembly comprises instructing the display to display a number of the plurality of patterns comprised in the pattern assembly, based on the number data.

14. A non-transitive computer-readable medium for an apparatus comprising:
a cartridge configured to receive a pen or a cutter;
a receiving mechanism configured to receive an object;
a first moving mechanism configured to move the cartridge in a first movement direction;
a second moving mechanism configured to move the object in a second direction perpendicular to the predetermined first movement direction; and a third moving mechanism configured to move the cartridge in a direction such that the cartridge comes close to the receiving mechanism, wherein the computer-readable medium storing computer-readable instructions, when executed by a processor of the apparatus, cause the apparatus to:

set an orientation of the pattern to be formed on the object based on pattern data;

arrange the pattern conforming the orientation of the pattern to an orientation of the object; and drive the first and second moving mechanisms according to the orientation of the pattern and the pattern data; and drive the third moving mechanism to cause the cartridge to move in a direction such that the cartridge comes close to the receiving mechanism.

15. The non-transitive computer-readable medium according to claim 14, wherein the apparatus further comprising:

a display, wherein the computer-readable instructions, when executed by the processor, further cause the apparatus to:

instruct the display to display the pattern to be formed on the object and an arrow indicative of the orientation of the object according to the pattern data, wherein the setting the orientation of the pattern comprises setting the arrow indicative of the orientation of the pattern, and wherein the arranging the pattern comprises arranging the pattern conforming the arrow indicative of the orientation of the pattern to the orientation of the object.

16. The non-transitive computer-readable The medium according to claim 14, wherein the computer-readable instructions, when executed by the processor, further cause the apparatus to:

receive selection of one of a plurality of pattern parts, the pattern composing the plurality of pattern parts, wherein the setting the orientation of the selected pattern part, and wherein the arranging the pattern comprises arranging the pattern part conforming the orientation of the pattern part to the orientation of the object.

17. The non-transitive computer-readable The medium according to claim 14, Wherein a plurality of patterns is combined into a pattern assembly, and wherein the setting the orientation of the pattern comprises setting orientations of the plurality of patterns.

18. The non-transitive computer-readable The medium according to claim 14, wherein the computer-readable instructions, when executed by the processor, further cause the apparatus to:

arrange the pattern while the orientation of the pattern is rotated 180° relative to the object.

19. The non-transitive computer-readable The medium according to claim 14, wherein the apparatus further comprising:

a display, wherein the computer-readable instructions, when executed by the processor, further cause the apparatus to:

instruct the display to display an arranged state of the pattern on the object.

20. An apparatus comprising:

a pen or a cutter;

a receiving mechanism configured to receive an object;

a first moving mechanism configured to move the pen or the cutter in a predetermined first movement direction;

a second moving mechanism configured to move the object in a second direction perpendicular to the predetermined first movement direction;

a third moving mechanism configured to move the pen or the cutter in a direction such that the pen or the cutter comes close to the receiving mechanism;

a processor configured to instruct the apparatus to:

set an orientation of a pattern to be formed on the object, based on pattern data;

arrange the pattern conforming the orientation of the pattern to an orientation of the object;

drive the first and second moving mechanisms according to the orientation of the pattern and the pattern data; and drive the third moving mechanism to cause the pen or the cutter to move in a direction such that the pen or the cutter comes close to the receiving mechanism.

* * * * *